US012485403B2

(12) United States Patent
Kang

(10) Patent No.: US 12,485,403 B2
(45) Date of Patent: Dec. 2, 2025

(54) METALLIC NANOPARTICLE CATALYSTS EMBEDDED IN POROUS OXIDE SUPPORT, WHICH SHOW HIGH CATALYTIC ACTIVITY EVEN AT LOW TEMPERATURES

(71) Applicant: QUANTUM CAT CO., LTD., Daejeon (KR)

(72) Inventor: Shin Hyun Kang, Sejong (KR)

(73) Assignee: QUANTUM CAT CO., LTD., Daejeon (KR)

( * ) Notice: Subject to any disclaimer, the term of this patent is extended or adjusted under 35 U.S.C. 154(b) by 894 days.

(21) Appl. No.: 17/292,986

(22) PCT Filed: Mar. 22, 2020

(86) PCT No.: PCT/KR2020/003914
§ 371 (c)(1),
(2) Date: May 11, 2021

(87) PCT Pub. No.: WO2020/197200
PCT Pub. Date: Oct. 1, 2020

(65) Prior Publication Data
US 2022/0016602 A1    Jan. 20, 2022

(30) Foreign Application Priority Data
Mar. 22, 2019    (KR) .................. 10-2019-0033141

(51) Int. Cl.
*B01J 23/52*    (2006.01)
*B01D 53/94*    (2006.01)
(Continued)

(52) U.S. Cl.
CPC ............ *B01J 23/52* (2013.01); *B01D 53/944* (2013.01); *B01J 21/04* (2013.01); *B01J 21/063* (2013.01);
(Continued)

(58) Field of Classification Search
None
See application file for complete search history.

(56) References Cited

U.S. PATENT DOCUMENTS 1,917,179 A * 7/1933 Young ..................... C07C 29/10
568/908

FOREIGN PATENT DOCUMENTS

JP    2014509927 A    4/2014
KR    20040068161 A    7/2004
(Continued)

OTHER PUBLICATIONS

Auyeung et al. JACS, 2015, 137, 1658-1662 (Year: 2015).*

*Primary Examiner* — Yun Qian
(74) *Attorney, Agent, or Firm* — CANTOR COLBURN LLP

(57) ABSTRACT

The present invention relates to a metallic nanoparticle catalyst, and more particularly, to a porous catalyst in which metallic nanoparticles are embedded in a porous oxide support, and a method for preparing the porous catalyst. To this end, a porous catalyst composition having metallic nanoparticles of the present invention includes an oxide matrix structure having mesopores and micropores; and metal or metal oxide nanoparticles embedded in the oxide matrix structure having the mesopores and micropores. Thus, metallic nanoparticle catalysts having high activity even at low temperature are realized.

10 Claims, 15 Drawing Sheets

(51) Int. Cl.

| | | |
|---|---|---|
| *B01J 21/04* | (2006.01) | |
| *B01J 21/06* | (2006.01) | |
| *B01J 21/08* | (2006.01) | |
| *B01J 35/30* | (2024.01) | |
| *B01J 35/45* | (2024.01) | |
| *B01J 35/66* | (2024.01) | |
| *B01J 37/00* | (2006.01) | |
| *B01J 37/04* | (2006.01) | |
| *B01J 37/08* | (2006.01) | |

(52) U.S. Cl.
CPC ............. *B01J 21/08* (2013.01); *B01J 35/393* (2024.01); *B01J 35/45* (2024.01); *B01J 35/66* (2024.01); *B01J 37/0018* (2013.01); *B01J 37/04* (2013.01); *B01J 37/082* (2013.01); *B01D 2255/106* (2013.01); *B01J 2235/00* (2024.01); *B01J 2235/30* (2024.01)

(56) References Cited

FOREIGN PATENT DOCUMENTS

| | | | |
|---|---|---|---|
| KR | 20080106806 A | 12/2008 | |
| KR | 20090126218 A | 12/2009 | |
| KR | 20160070959 A | 6/2016 | |
| KR | 20180035118 A | 4/2018 | |
| WO | WO-2018062646 A2 * | 4/2018 | ........... B01D 53/864 |

* cited by examiner

[FIG. 1]
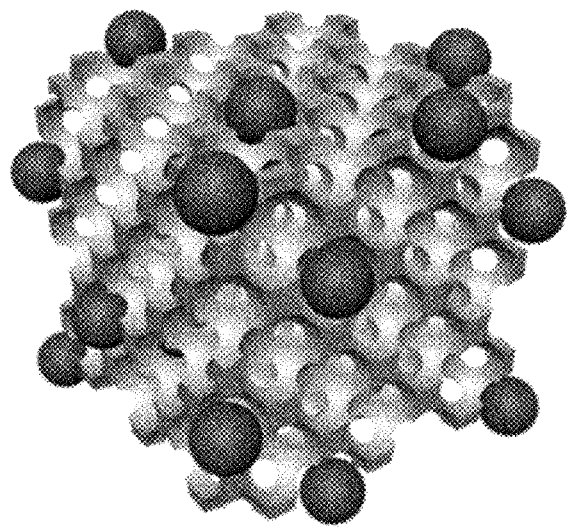
[FIG. 2]
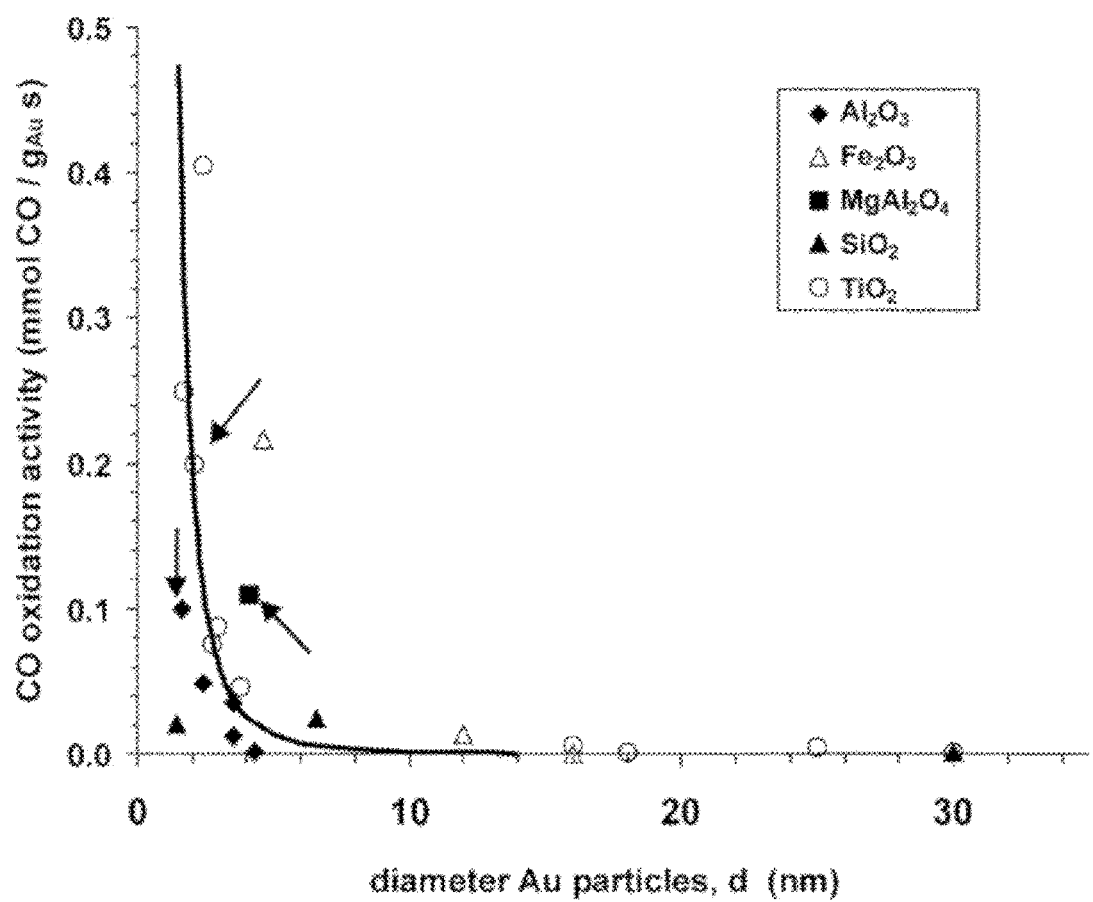

[FIG. 3]
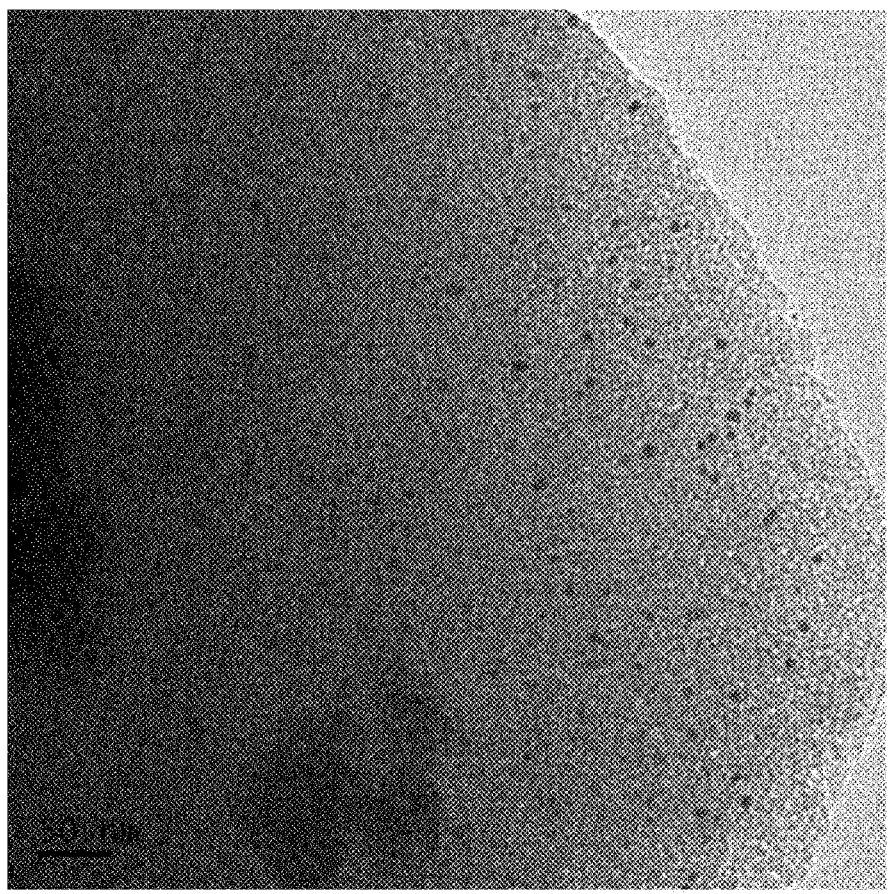

[FIG. 4(a)]
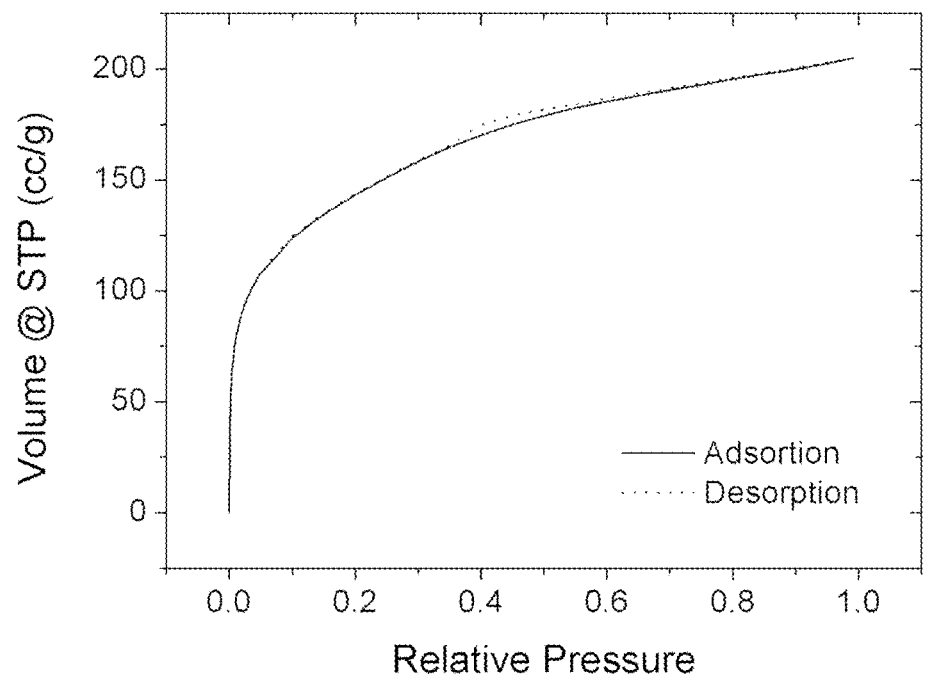
[FIG. 4(b)]
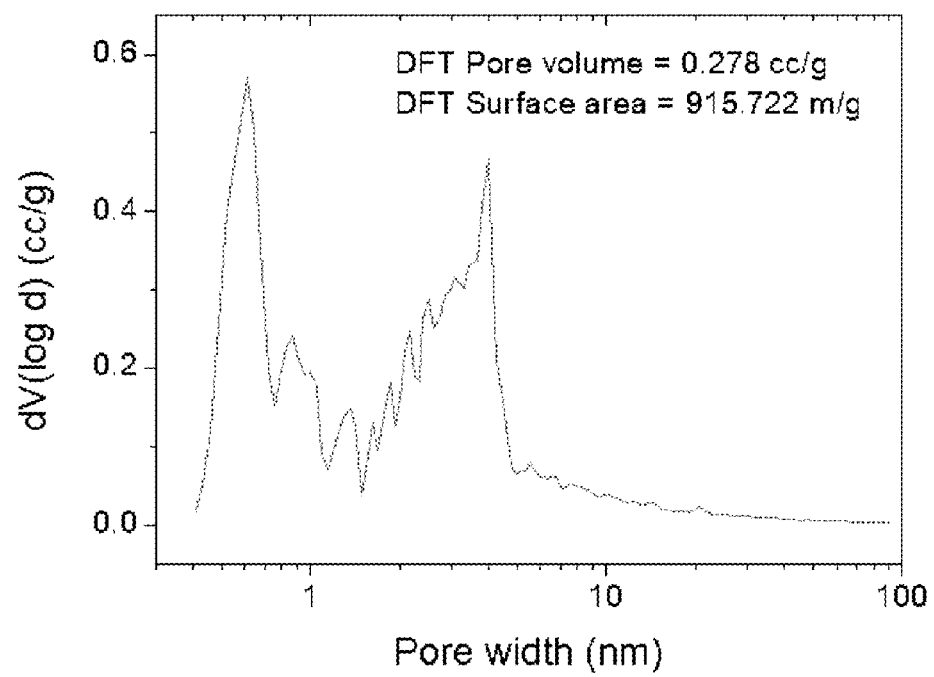

[FIG. 5]
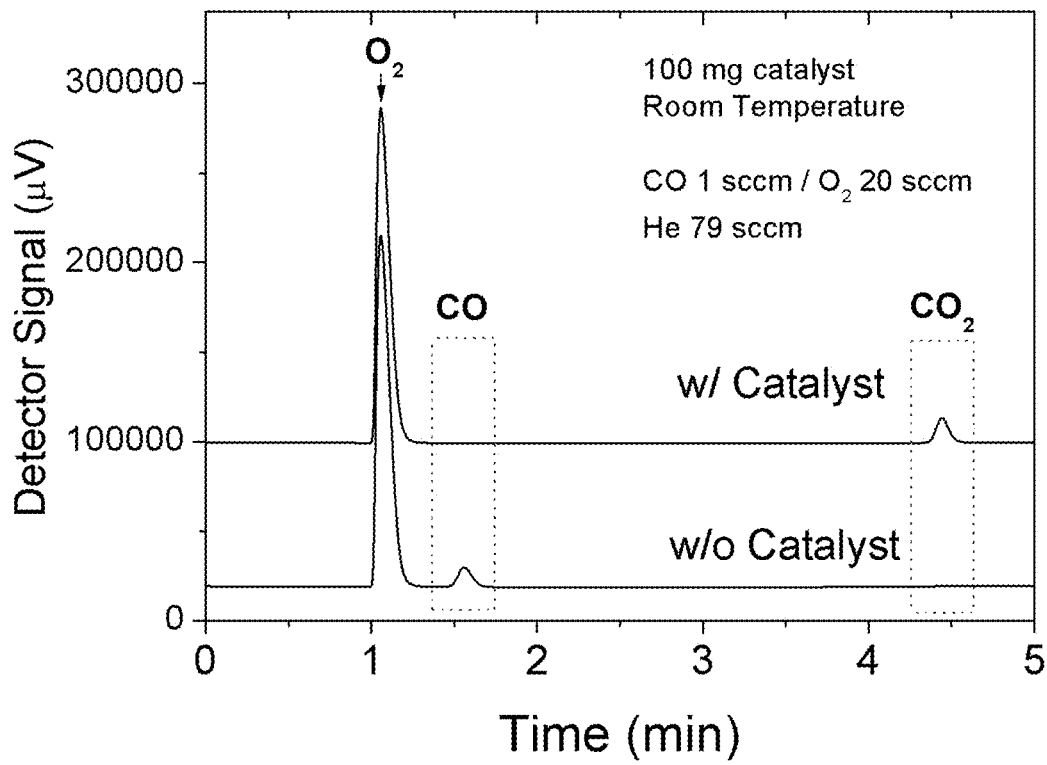
[FIG. 6]
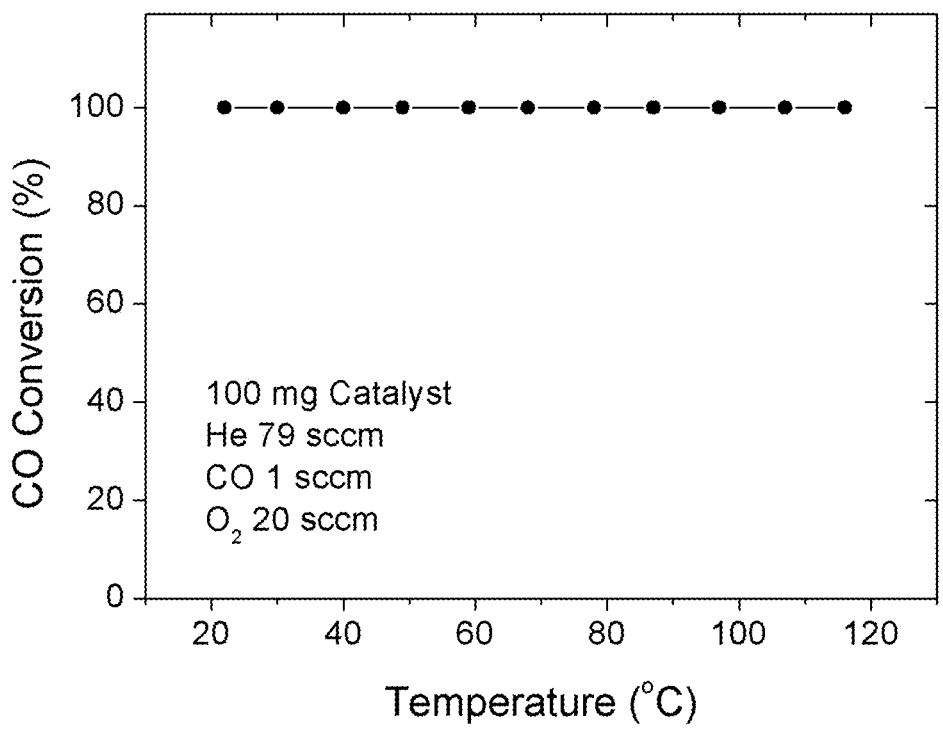

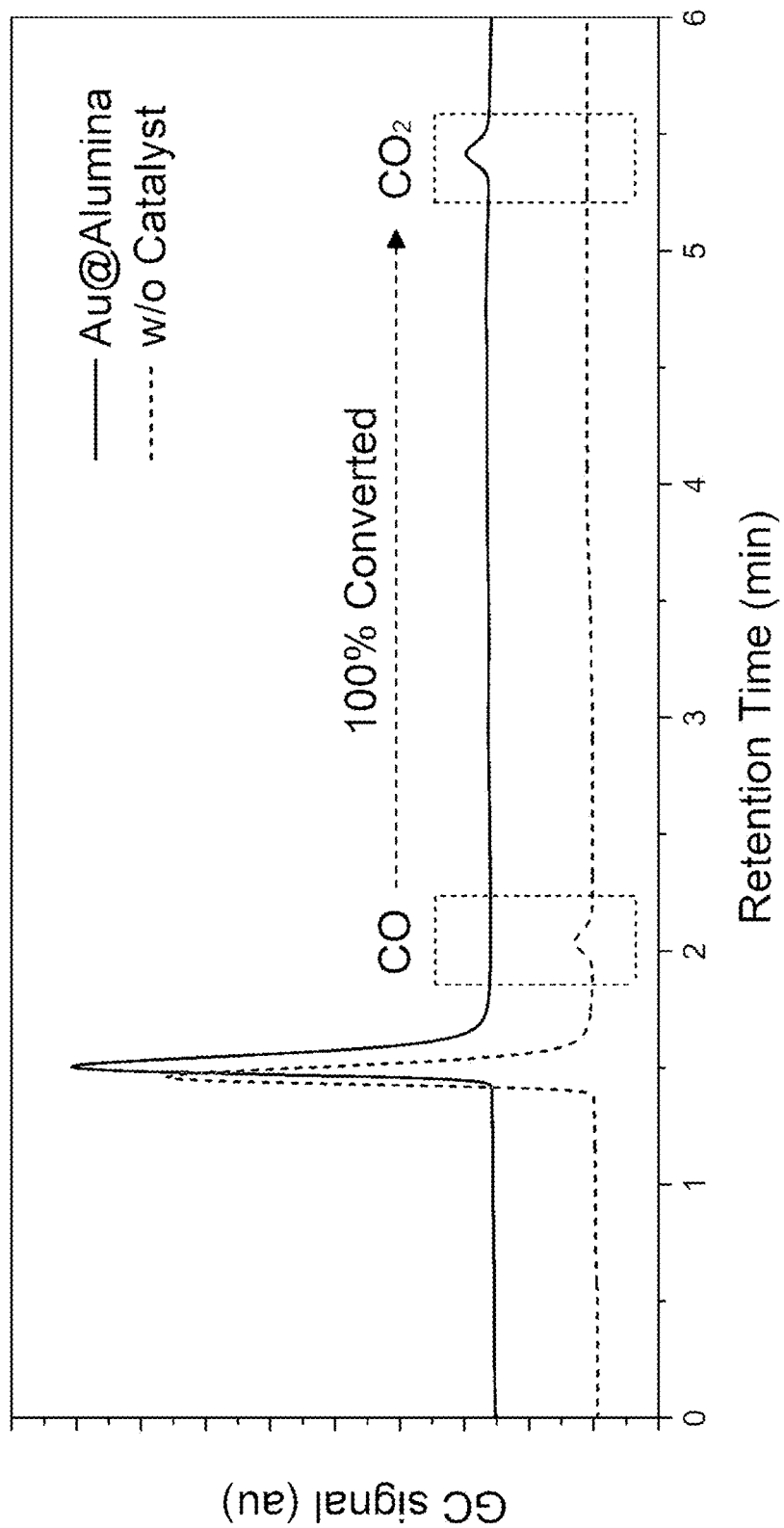
[FIG. 7]

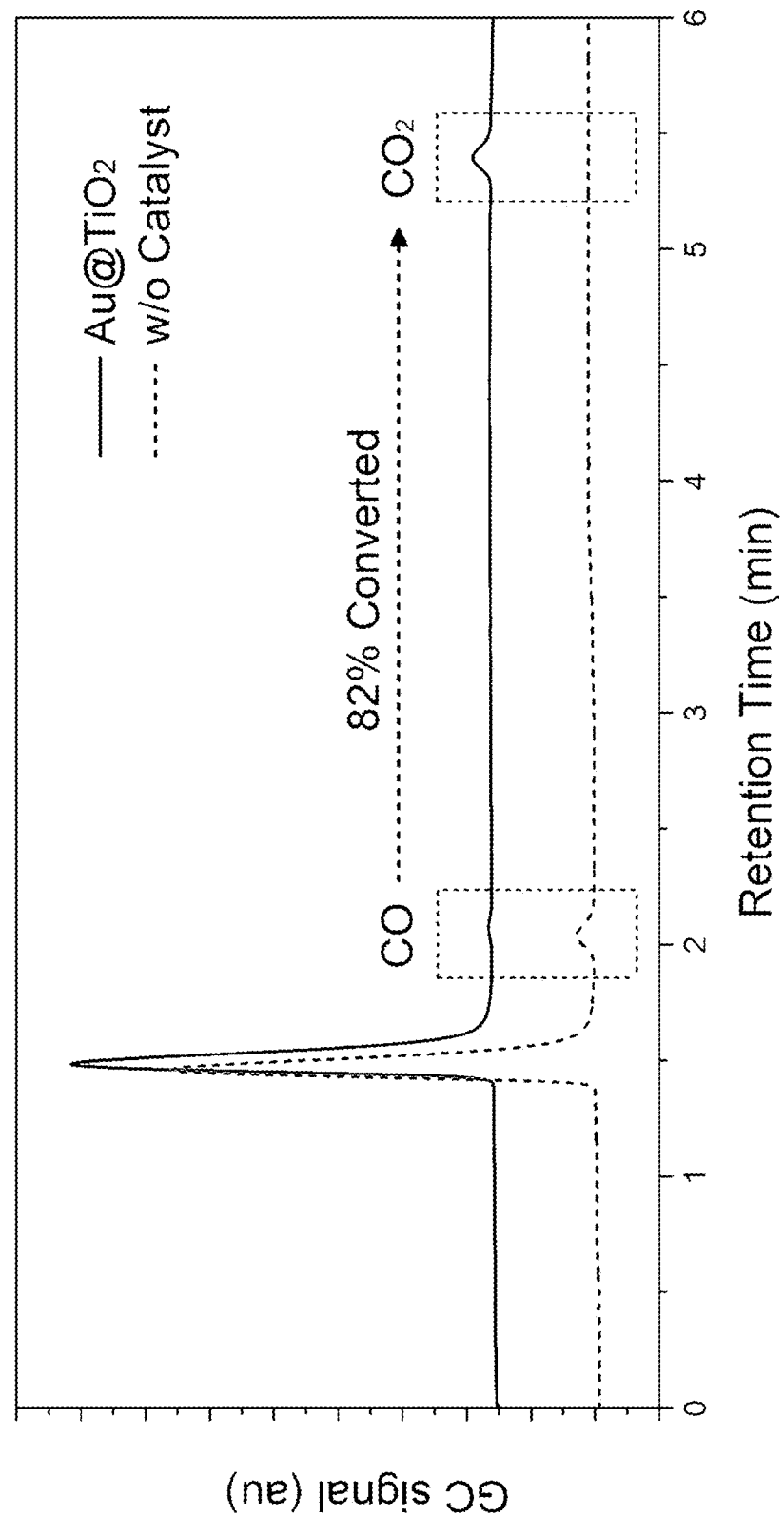
[FIG. 8]

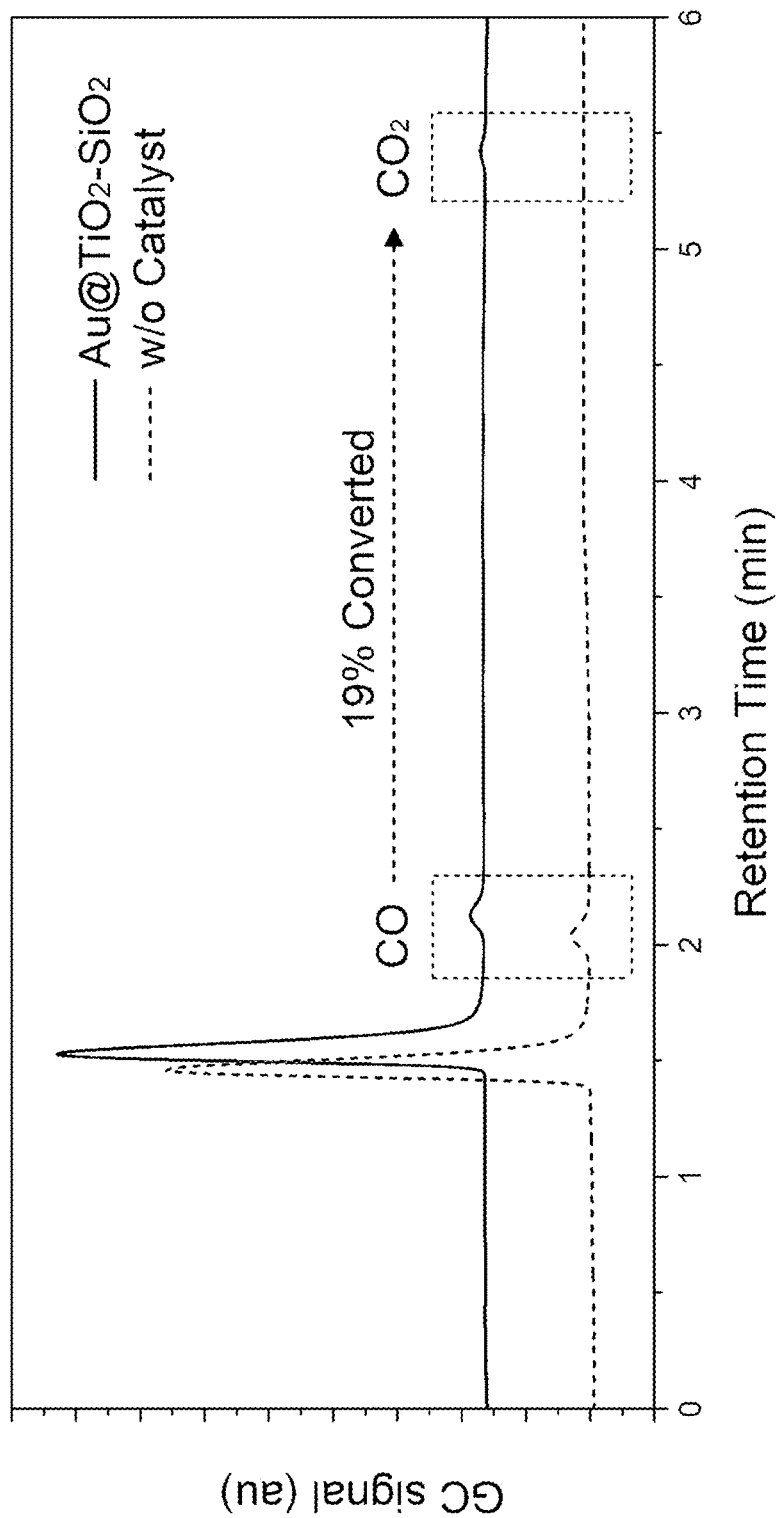
[FIG. 9]

[FIG. 10]
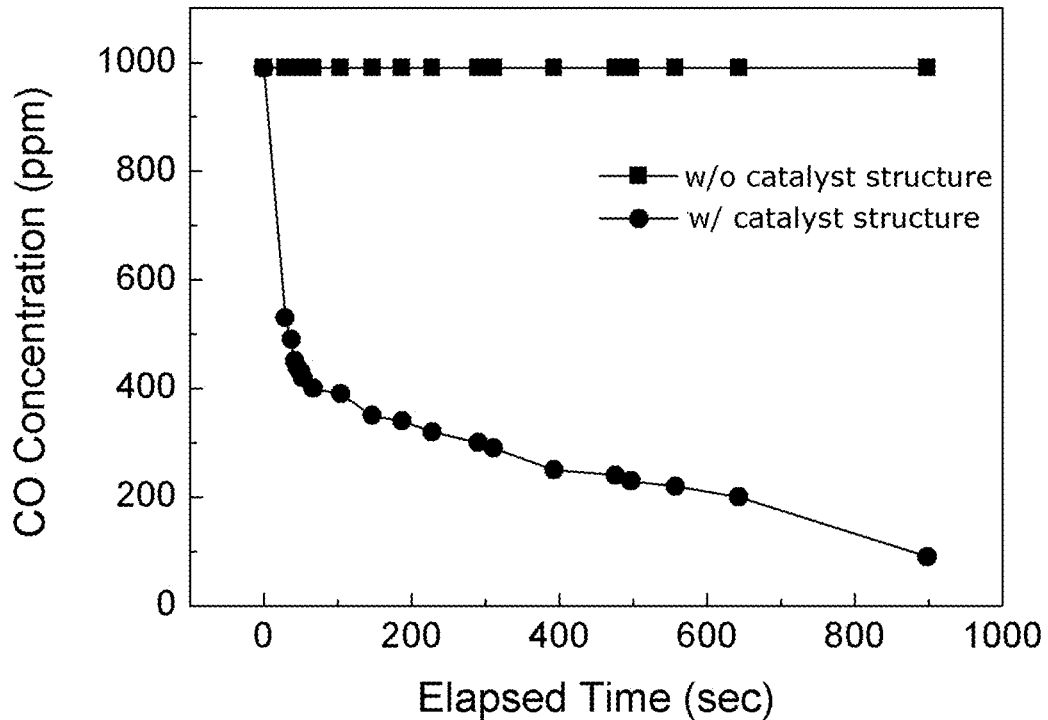
[FIG. 11]
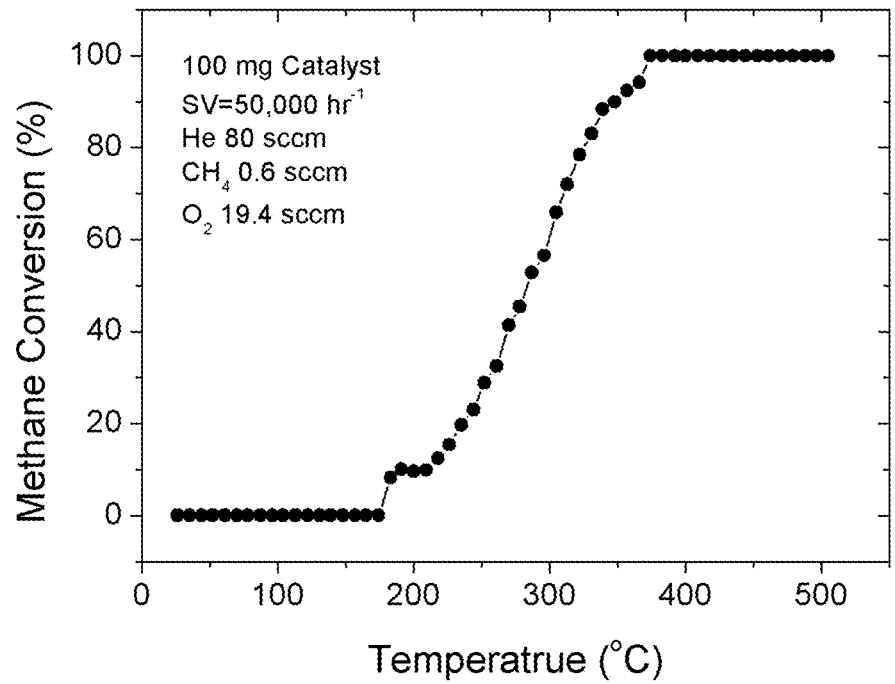

[FIG. 12]
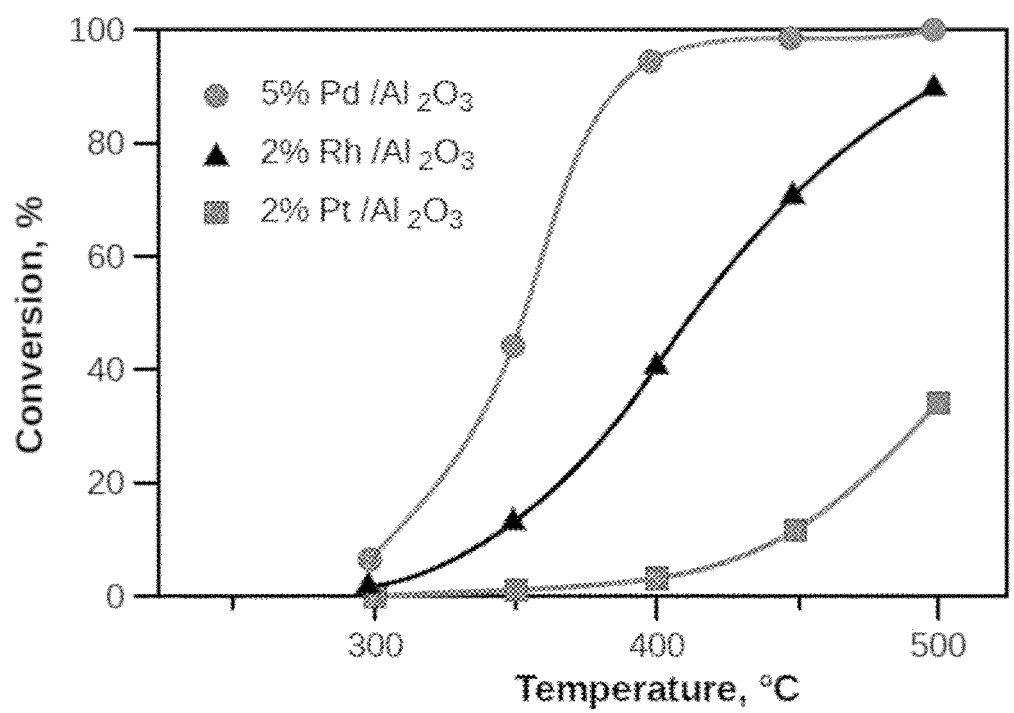

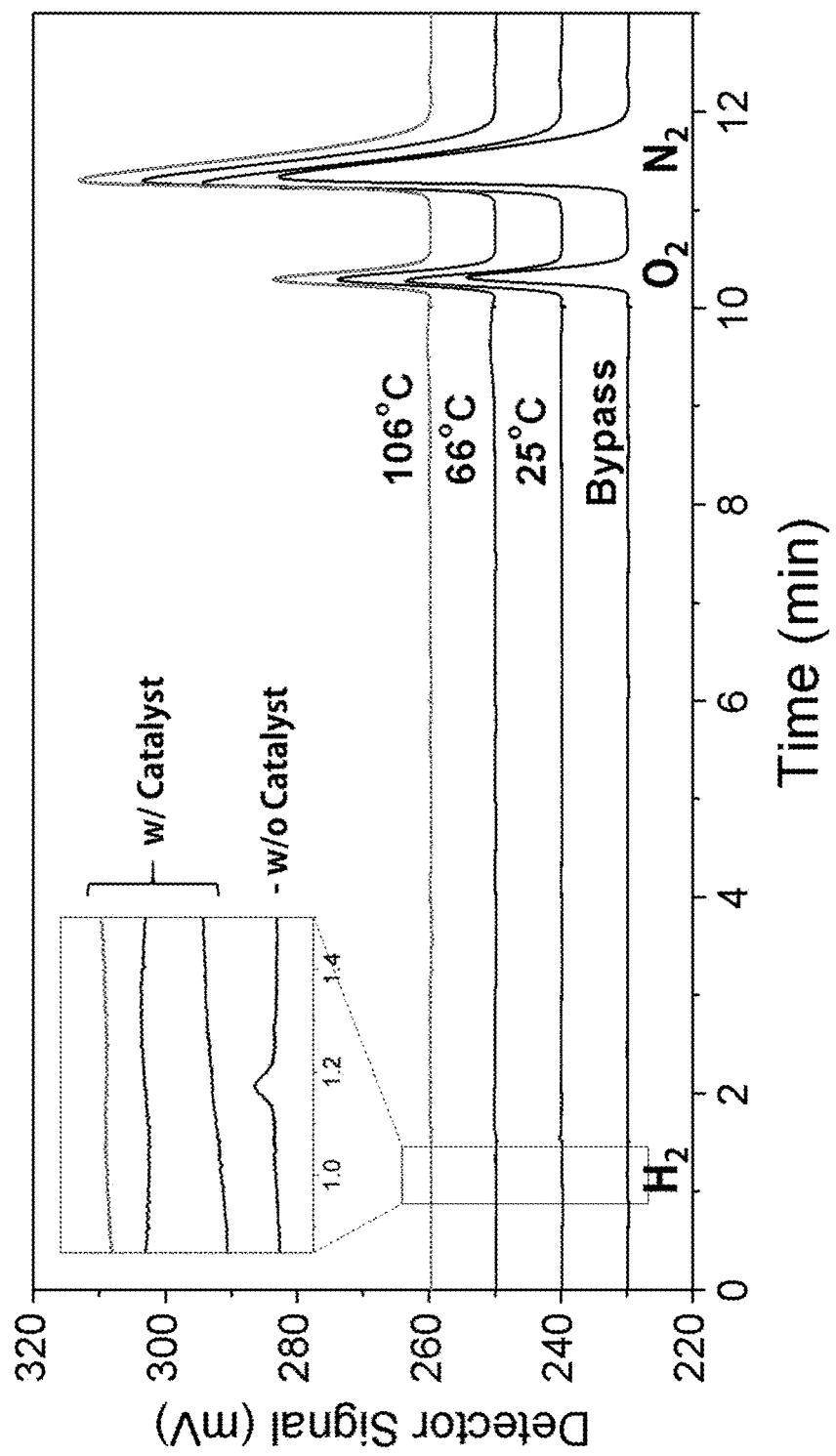
[FIG. 13]

[FIG. 14]
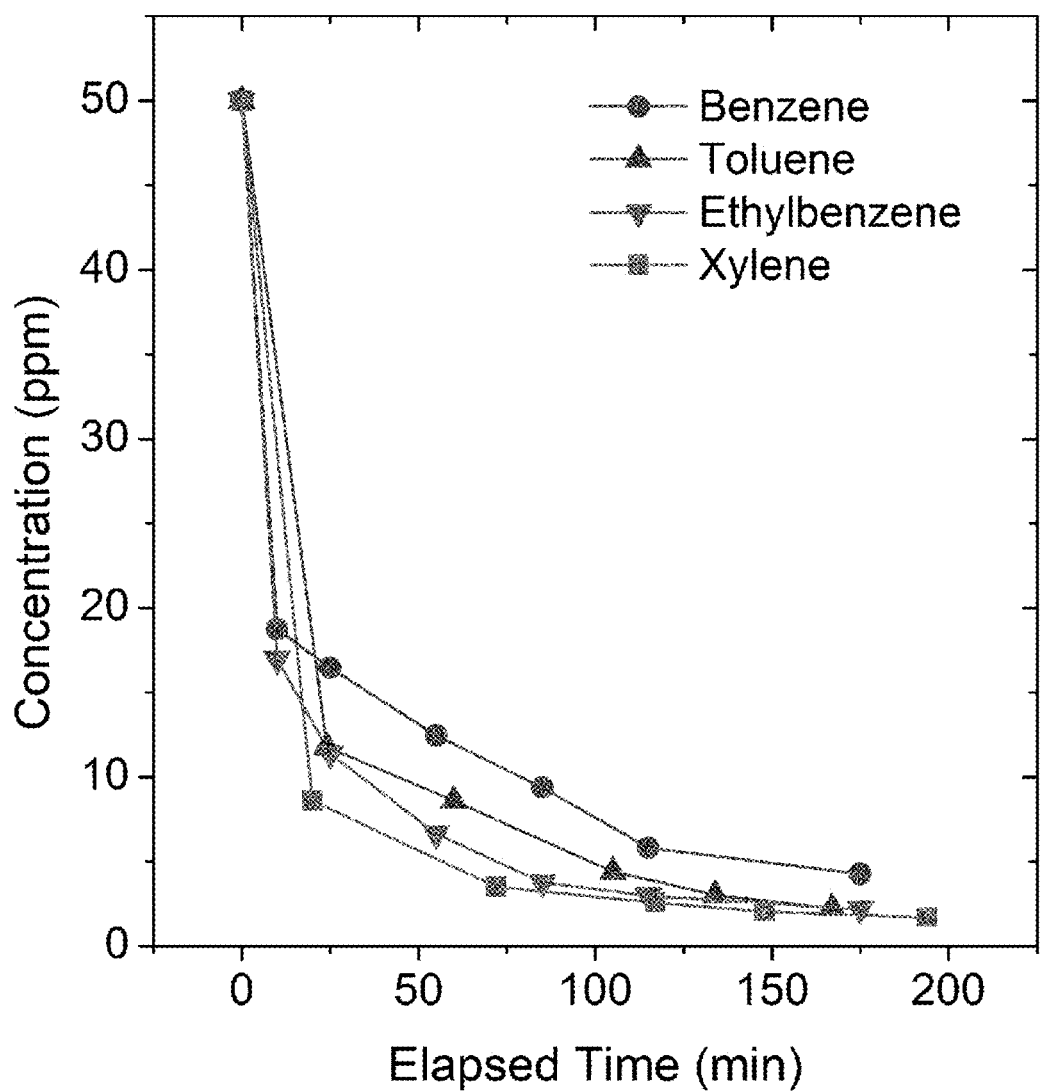

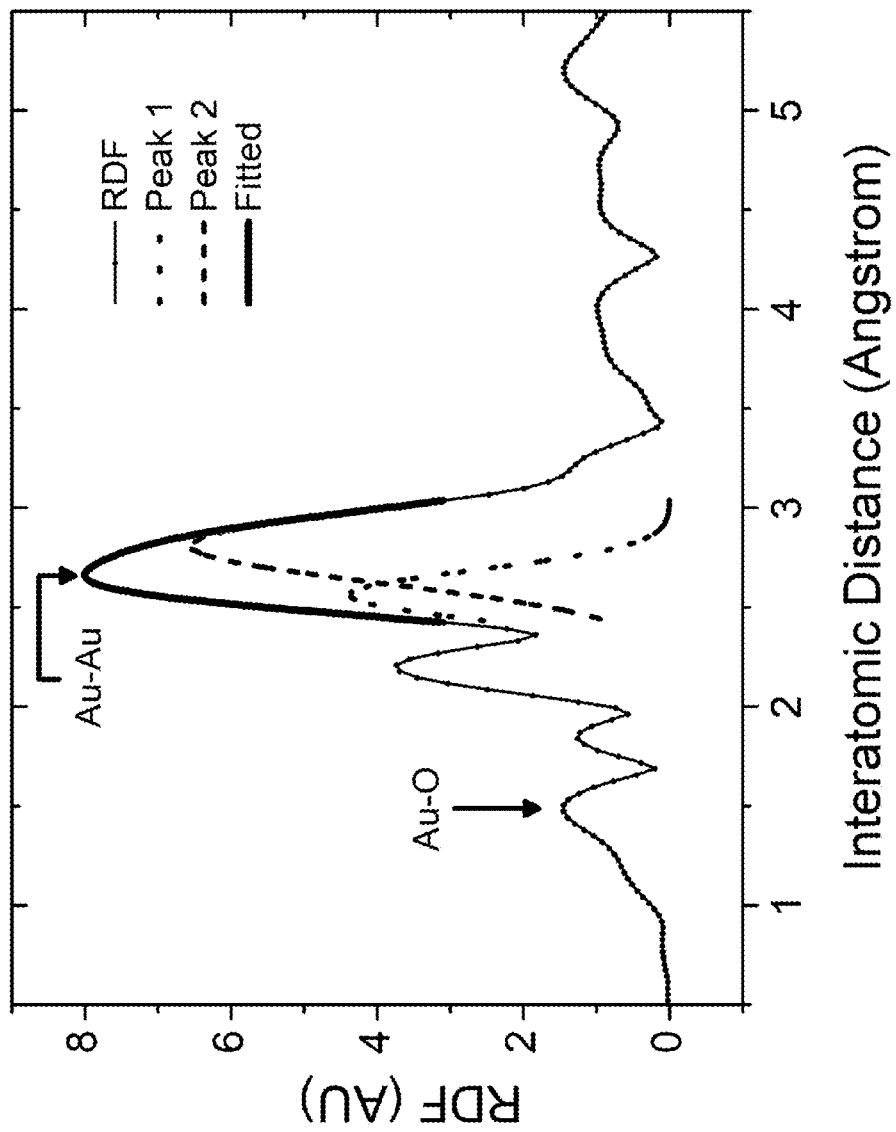
[FIG. 15]

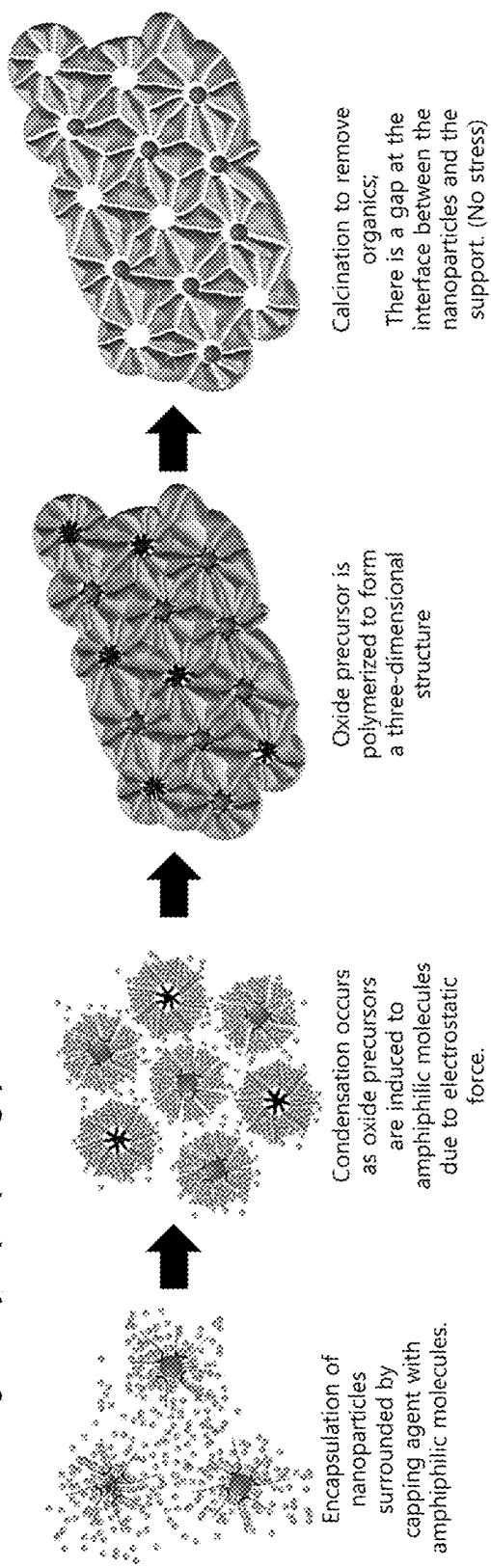
[FIG. 16]

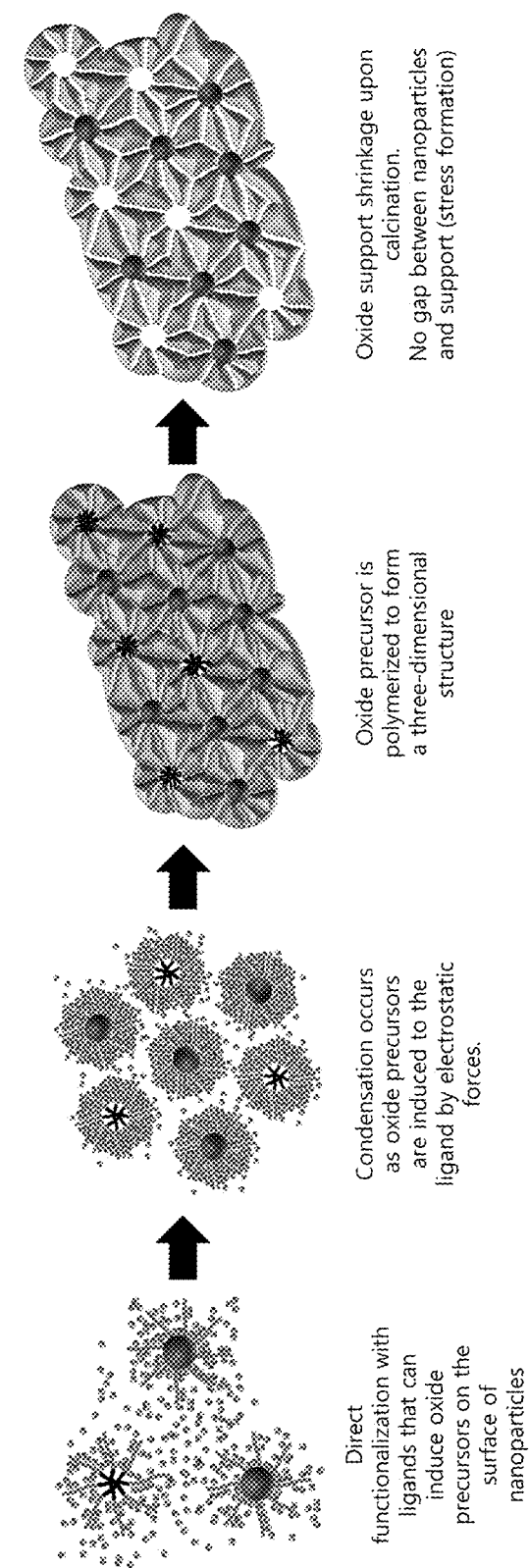
[FIG. 17]

[FIG. 18]
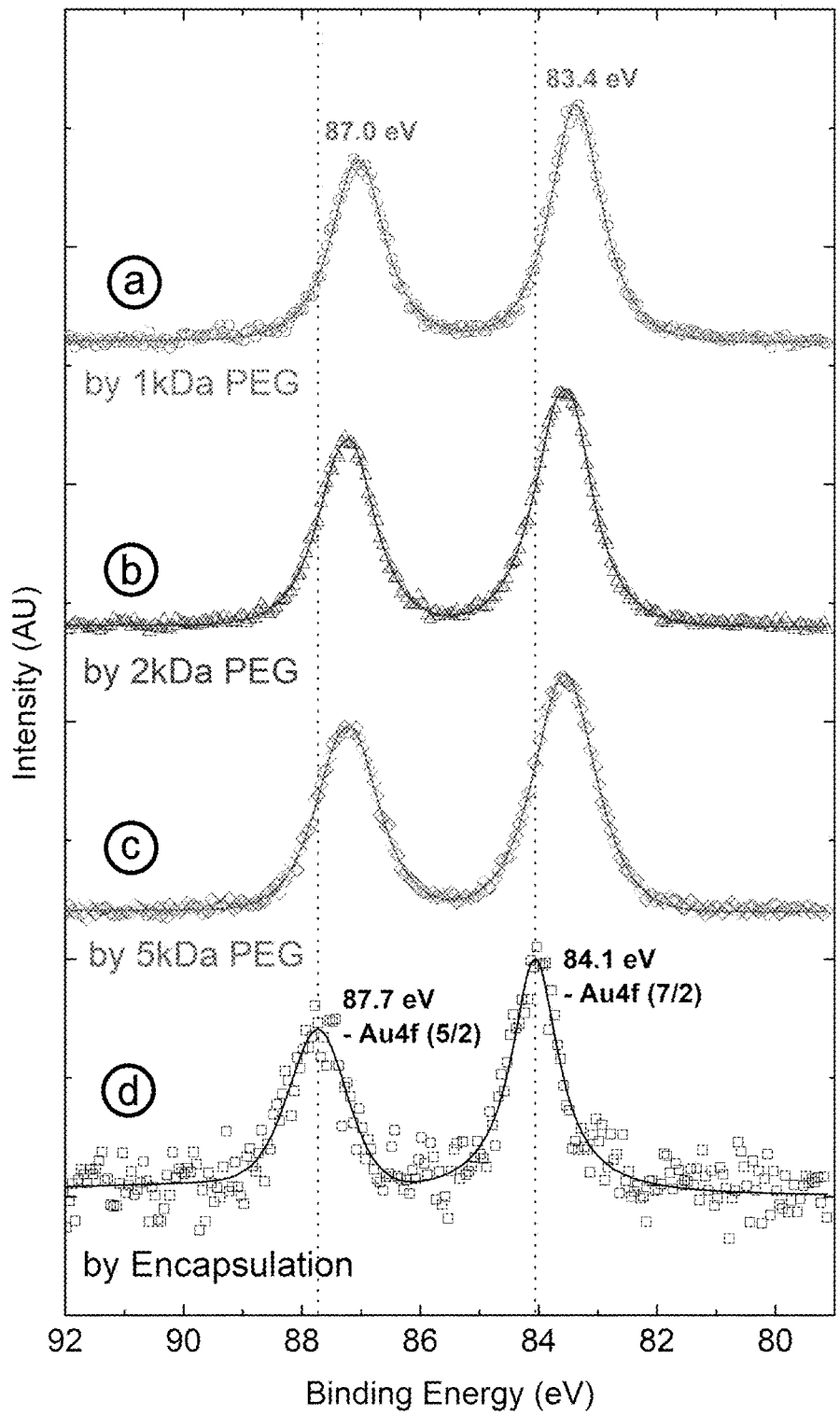

METALLIC NANOPARTICLE CATALYSTS EMBEDDED IN POROUS OXIDE SUPPORT, WHICH SHOW HIGH CATALYTIC ACTIVITY EVEN AT LOW TEMPERATURES

TECHNICAL FIELD

The present invention relates to a metallic nanoparticle catalyst, and more particularly, to a porous catalyst in which metallic nanoparticles are embedded in a porous oxide support, and a method for preparing the porous catalyst.

BACKGROUND ART

Heterogeneous catalysts are essential elements that control 90% or more of the world's chemical processes. A catalyst substance mainly composed of metal does not directly participate in a reaction but lowers activation energy through an interaction with a reaction substance on the surface thereof to reduce the energy cost to increase the economics of the processes. Over the past decades, nanoscience and nanotechnology have rapidly developed, and catalyst technology has also been more elaborately deepened. When the catalyst substance is made of nanometer-sized particles, the surface area where a reaction is caused is dramatically increased. Thus, it is possible to realize catalysts having very high efficiency even with a small amount of catalyst substance. However, nanoparticles have very low stability. Thus, in a case where atoms on the surfaces of the nanoparticles are not appropriately protected by organic substances and are exposed, the nanoparticles are easily sintered with nearby nanoparticles and become larger particles. In a case where the nanocatalyst particles are sintered during a reaction, the surface area of the catalyst and the catalytic activity decreases. Eventually, the lifespan of the catalyst is shortened, thereby increasing the cost of the catalyst.

Meanwhile, currently, catalyst substances most widely used in various chemical processes worldwide, including automobile exhaust gas purifiers, are platinum group metals such as platinum, palladium, and rhodium. As regulations related to exhaust gas in each country become more and more stringent in recent years, the prices of the platinum group metals are on a continuous upward trend with increasing demands. 85% or more of about 170 tons of platinum mined annually is already used as catalysts for automobiles and chemical processes, and palladium is already in need of 1.5 times or more about 190 tons, which is the annual mining amount, just in terms of catalyst demand. In the case of rhodium, the annual mining amount itself is only about 20 tons. For this reason, the instability of the price of rhodium is very large, and the ratio of the highest price to the lowest price for the past 10 years is 10 times or more (www.infomine.com). In this way, due to the growing demand for eco-friendly and energy-reducing catalysts such as automobile exhaust gas purifiers and fuel cells, there is a concern about the depletion of the resources of the platinum group metals as well as the soaring of the price thereof. Thus, there is a situation in which the development of catalysts to replace the platinum group is urgently required.

Among these, gold nanocatalysts have recently been in the spotlight as potential substitutes for the platinum group catalysts. Compared to the platinum group metals, gold has a much richer mining amount (about 3,347 tons in 2018, www.gold.org) and reserve. Thus, characteristics that surpass those of the platinum group in terms of performance as catalysts are shown as well as allowing a relatively stable supply. Gold in bulk was known to have no activity as catalysts. However, in 1987, it was found that nanoparticle gold has very high catalytic activity from low temperature, and it was confirmed that a reaction occurs at a much lower temperature than the platinum group in a carbon monoxide oxidation reaction or the like. For the past thirty years since then, active and intensive researches on the gold nanoparticle catalysts have been performed worldwide.

However, since the melting point (1,064° C.) of gold is lower than the melting point (1,768° C.) of platinum, the melting point (1,964° C.) of rhodium, the melting point (1,555° C.) of palladium, or the like, the fluidity on particle surfaces increases from a relatively low temperature. In the case of nanoparticles, it is disadvantageous to ensure stability as catalysts in a high-temperature reaction environment because the nanoparticles are easily sintered with nearby particles. For example, the Tamman temperature, which is a temperature at which the fluidity on metal surfaces rapidly increases, is about 396° C. in the case of gold, but the temperature of general automobile exhaust gas is about 400 to 600° C. Thus, unless the structural stability of gold nanoparticles is sufficiently ensured, it is impossible to use the gold nanoparticles for industrial purposes requiring a high-temperature environment, such as catalysts for purifying automobile exhaust gas. Gold nanocatalysts currently developed mostly have a form in which gold nanoparticles are exposed and attached to the surface of a support made of an oxide, and have a structure that cannot guarantee the safety of the catalysts at high temperatures.

Therefore, there is a need to develop catalyst technology capable of solving the inconvenience of blocking channels and reducing catalytic activity because the nanoparticles of the catalysts shake or do not spread uniformly in the support.

DETAILED DESCRIPTION OF INVENTION

Technical Challenges

A technical challenge to be achieved by the present invention is to provide a metallic nanoparticle dispersion in a form in which, in addition to silica and alumina that are oxides that can guarantee thermal and chemical stability, titanium oxide or the like is used as a matrix structure to protect metallic nanoparticles, and pores are secured in an oxide matrix so that a reactant of a catalytic reaction can contact the surfaces of the metallic nanoparticles.

In addition, another technical challenge of the present invention is to provide a preparing method for synthesizing a catalyst in the form of the metallic nanoparticles confined inside an oxide nanocage.

In addition, another technical challenge of the present invention is to provide a method for oxidizing carbon monoxide (CO) using the catalyst composition to remove carbon monoxide (CO).

In addition, another technical challenge of the present invention is to provide a method for oxidizing methane ($CH_4$) using the catalyst composition to remove methane ($CH_4$).

In addition, another technical challenge of the present invention is to provide a hydrogen oxidation method for oxidizing hydrogen ($H_2$) using the catalyst composition.

In addition, another technical challenge of the present invention is to provide a method for removing volatile organic compounds (VOC) using the catalyst composition.

In addition, another technical challenge of the present invention is to provide a method for oxidizing benzene, toluene, ethylbenzene, and xylene using the catalyst composition to remove benzene, toluene, ethylbenzene, and xylene.

The technical challenges to be achieved by the present invention are not limited to the technical challenges mentioned above, and other technical challenges that are not mentioned can be clearly understood by those having ordinary knowledge in the art to which the present invention pertains from the following description.

Technical Solution

In order to achieve the above technical challenges, a porous catalyst composition having metallic nanoparticles according to the present invention is configured to include an oxide matrix structure having mesopores and micropores; and metallic oxide nanoparticles embedded in the oxide matrix structure having the mesopores and micropores.

In addition, in the porous catalyst composition having metallic nanoparticles according to the present invention, the oxide matrix structure may be configured from at least any one selected from a group consisting of silica, alumina, titanium oxide, iron oxide, cerium oxide, tungsten oxide, cobalt oxide, magnesium oxide, zirconium oxide, calcium oxide, sodium oxide, manganese oxide, and the like, and combinations thereof.

In addition, a method for preparing a porous catalyst composition having metallic nanoparticles according to the present invention includes a step of binding a polymer to surfaces of metallic nanoparticles stabilized by being covered with a stabilizer to functionalize the metallic nanoparticles; a step of mixing an oxide precursor with a solution in which the functionalized metallic nanoparticles and an activator are mixed and dispersed, thereby synthesizing a metallic nanoparticle dispersion embedded in a porous oxide support; and a step of calcining the metallic nanoparticle dispersion.

In addition, in the method for preparing a porous catalyst composition having metallic nanoparticles according to the present invention, the stabilizer may be configured from at least any one or more selected from a group consisting of oleylnamine, sodium citrate, chitosan, polyvinyl alcohol, polyvinyllipolidone, polyDADMAC, oleic acid, and the like.

In addition, in the method for preparing a porous catalyst composition having metallic nanoparticles according to the present invention, a polymer used for the functionalization may have a molecular weight selected in a range of 200 to 20 k Da, and more preferably, may have a molecular weight selected in a range of 300 to 10 k Da.

In addition, in the method for preparing a porous catalyst composition having metallic nanoparticles according to the present invention, a length of pores may be configured to be adjusted by adjusting the molecular weight of the polymer used for the functionalization.

In addition, in the method for preparing a porous catalyst composition having metallic nanoparticles according to the present invention, the activator may be configured to be selected from amphiphilic molecules that form a spherical micelle and a block copolymer of a hydrophilic chain and a hydrophobic chain.

In addition, in the method for preparing a porous catalyst composition having metallic nanoparticles according to the present invention, a mesopore ratio or the like may be configured to be adjusted by adjusting an amount of the activator when the functionalized metallic nanoparticles and the activator are mixed.

In addition, in the method for preparing a porous catalyst composition having metallic nanoparticles according to the present invention, the oxide precursor may be one for forming at least one or more oxides selected from a group consisting of silica, alumina, titanium oxide, iron oxide, cerium oxide, tungsten oxide, cobalt oxide, magnesium oxide, zirconium oxide, calcium oxide, sodium oxide, and manganese oxide.

In addition, in the method for preparing a porous catalyst composition having metallic nanoparticles according to the present invention, the silica precursor may be configured from any one selected from a group consisting of tetramethylsilicate, tetraethyl orthosilicate, tetrapropylorthosilicate, tetrabutylorthosilicate, tetrachlorosilane, sodiumsilicate, tetraisopropoxysilane, methoxytriethoxysilane, dimethoxydiethoxysilane, ethoxytrimethoxysilane, methyltrimethoxysilane, methyltriethoxysilane, ethyltriethoxysilane, dimethyldimethoxysilane, dimethyldiethoxysilane, diethyldiethoxysilane, tetramethoxymethylsilane, tetramethoxyethylsilane, tetraethoxymethylsilane, and combinations thereof.

In addition, in the method for preparing a porous catalyst composition having metallic nanoparticles according to the present invention, the alumina precursor may be selected from a group consisting of aluminum ethoxide, aluminum nitrate nonahydrate, aluminum fluoride trihydrate, aluminum phosphate hydrate, aluminum chloride hexahydrate, aluminum hydroxide, aluminum sulfate hexadecahydrate, aluminum ammonium sulfate dodecahydrate, and combinations thereof, and aluminum ethoxide may be preferably used.

In addition, in the method for preparing a porous catalyst composition having metallic nanoparticles according to the present invention, the titanium dioxide precursor may be selected from a group consisting of titanium tetraisopropoxide, titanium butoxide, titanium ethoxide, titanium oxysulfate, titanium chloride, and combinations thereof, and titanium tetraisopropoxide may be preferably used.

In addition, a redox catalyst using a porous catalyst composition according to the present invention is configured to include the porous catalyst composition.

Moreover, the redox catalyst using a porous catalyst composition according to the present invention may be configured to oxidize at least one of carbon monoxide and hydrogen, methane, a volatile organic compound (VOC), benzene, toluene, ethylbenzene, and xylene.

Advantageous Effects of Invention

The porous catalyst composition having metallic nanoparticles according to the present invention has an effect of forming a thermally and chemically safe structure and exhibiting very high activity from a low temperature, thereby remarkably improving catalyst performance.

In addition, in the method for preparing a porous catalyst composition having metallic nanoparticles according to the present invention, it is easy to perform the adjustment of lowering or increasing the ratio of the mesopores and micropores depending on user's needs. Thus, the choice of forming the mesopores at the same level as or at a higher level than the micropores is possible. Through this choice, it is possible to reduce the resistance to a flow through a reaction target fluid. Thus, there is an effect of greatly improving the phenomenon in which the fluidity is lowered due to the installation of the catalyst in industrial use.

The effects of the present invention are not limited to the above effects and should be understood to include all effects that can be inferred from the configuration of the invention described in the detailed description or claims of the present invention.

BRIEF DESCRIPTION OF DRAWINGS

FIG. 1 is a schematic diagram of a metallic nanoparticle dispersion embedded in a porous oxide support in a porous catalyst composition of the present invention.

FIG. 2 shows carbon monoxide oxidation catalytic activity depending on the particle size and support material of a gold nanoparticle catalyst in the gold nanoparticle catalyst of the related art.

FIG. 3 shows a transmission electron microscope image of a gold nanoparticle catalyst dispersed and embedded in porous silica in a metallic nanoparticle catalyst composition according to an embodiment of the present invention.

FIG. 4(a) shows an Ar adsorption curve of a gold nanoparticle catalyst composition dispersed in the porous silica and FIG. 4(b) shows a pore volume distribution depending on pore size in the metallic nanoparticle catalyst composition according to the embodiment of the present invention.

FIG. 5 shows a gas chromatographic curve of a carbon monoxide room-temperature oxidation experiment using the gold nanoparticle catalyst embedded in the porous silica in the metallic nanoparticle catalyst composition according to the embodiment of the present invention.

FIG. 6 shows a carbon monoxide conversion rate depending on the temperature of a carbon monoxide catalytic oxidation reaction using the gold nanoparticle catalyst embedded in the porous silica in the metallic nanoparticle catalyst composition according to the embodiment of the present invention.

FIG. 7 shows a carbon monoxide conversion rate at room temperature of a carbon monoxide catalytic oxidation reaction using the gold nanoparticle catalyst embedded in porous alumina in the metallic nanoparticle catalyst composition according to the embodiment of the present invention.

FIG. 8 shows a carbon monoxide conversion rate at room temperature of a carbon monoxide catalytic oxidation reaction using the gold nanoparticle catalyst embedded in porous titanium oxide in the metallic nanoparticle catalyst composition according to the embodiment of the present invention.

FIG. 9 shows a carbon monoxide conversion rate at room temperature of a carbon monoxide catalytic oxidation reaction using the gold nanoparticle catalyst embedded in a porous silica ($SiO_2$)-titanium oxide ($TiO_2$) mixed support in the metallic nanoparticle catalyst composition according to the embodiment of the present invention.

FIG. 10 shows a carbon monoxide concentration change rate over time in a carbon monoxide removal performance experiment of an air purifier containing a gold nanoparticle catalyst composition according to the embodiment of the present invention.

FIG. 11 shows a conversion rate depending on the temperature of a methane oxidation reaction using the gold nanoparticle catalyst embedded in the porous silica in the metallic nanoparticle catalyst composition according to the embodiment of the present invention.

FIG. 12 shows a conversion rate depending on the temperature of a methane oxidation reaction ($CH_4$ 1000 ppm, $O_2$ 10%, $H_2O$ 10%, and SV=40,000 l/h) using a platinum group metal catalyst of the related art.

FIG. 13 shows the results of a hydrogen oxidation reaction using the gold nanoparticle catalyst embedded in the porous silica in the metallic nanoparticle catalyst composition according to the embodiment of the present invention.

FIG. 14 shows the oxidation catalytic reactivity, in a room-temperature and normal-pressure atmosphere, of benzene, toluene, ethylbenzene, and xylene that are volatile organic compounds (VOC) using the gold nanoparticle catalyst embedded in the porous silica in the metallic nanoparticle catalyst composition according to the embodiment of the present invention.

FIG. 15 shows the results obtained by analyzing the catalysts of the present invention using an extended X-ray absorption fine structure (EXAFS) analysis method.

FIG. 16. is a schematic diagram of an existing nanocage structure catalyst preparing process.

FIG. 17. is a schematic diagram of a process for preparing a catalyst structure according to the present invention.

FIG. 18 is a graph obtained by measuring the binding energy of gold nanoparticles dispersed in the catalyst structure of the present invention and the binding energy of gold nanoparticles dispersed in the existing gold nanoparticles catalyst structure, using the X-ray photoelectron spectroscopy (XPS).

BEST MODES FOR CARRYING OUT INVENTION

Hereinafter, the present invention will be described with reference to the accompanying drawings. However, the present invention may be implemented in various different forms and is not limited to an embodiment described herein.

Throughout the specification, when a certain portion is said to be "coupled (connected, contacted, or combined)" with another portion, it includes not only "directly coupled" but also "indirectly coupled" via another member. In addition, when a certain portion "includes" a certain component, it means that other components may be further provided, rather than excluding other components unless otherwise specified.

The terms used in the present specification are just used to describe a specific embodiment and are not intended to limit the present invention. Singular expressions include plural expressions unless clearly otherwise meant in context. In the present specification, terms such as "include" or "have" are intended to designate the presence of features, numbers, steps, actions, components, parts, or combinations thereof described in the specification and should be understood not to exclude in advance the possibility of the presence or addition of one or more other features, numbers, steps, actions, components, parts, or combinations thereof.

First, referring to respective drawings, FIG. 1 is a schematic diagram showing a metallic nanoparticle dispersion embedded in porous silica in a porous catalyst composition of the present invention and showing the structure of a metallic nanoparticle dispersion in which at least one or more mesopores are formed between metallic nanoparticles. FIG. 2 shows carbon monoxide oxidation catalytic activity depending on the particle size and support material of a gold nanoparticle catalyst in the gold nanoparticle catalyst of the related art and shows that a silica support is known to have no special advantages in terms of low-temperature activity. FIG. 3 shows a transmission electron microscope image of a gold nanoparticle catalyst dispersed and embedded in porous silica in a metallic nanoparticle catalyst composition according to an embodiment of the present invention. It can be seen from FIG. 3 that the gold nanoparticle catalyst has a structure in which gold nanoparticles are embedded between a number of mesopores in non-uniform distribution.

FIGS. 4(a) and 4(b) shows the Ar adsorption curve of a gold nanoparticle catalyst composition dispersed in the porous silica and a pore volume distribution depending on pore size in the metallic nanoparticle catalyst composition according to the embodiment of the present invention. FIG. 5 shows a gas chromatographic curve of a carbon monoxide room-temperature oxidation experiment using the gold nanoparticle catalyst embedded in the porous silica in the metallic nanoparticle catalyst composition according to the embodiment of the present invention. The carbon monoxide oxidation conversion effects can be confirmed from FIGS. 4(a) and 4(b) and FIG. 5. FIG. 6 shows a carbon monoxide conversion rate depending on the temperature of a carbon monoxide catalytic oxidation reaction using the gold nanoparticle catalyst embedded in the porous silica in the metallic nanoparticle catalyst composition according to the embodiment of the present invention. It can be confirmed from FIG. 6 that the carbon monoxide conversion performance is consistently provided at an excellent level from room temperature to a high-temperature range.

FIG. 7 shows a gas chromatographic curve of a carbon monoxide room-temperature oxidation experiment using a catalyst in which the gold nanoparticles are dispersed in porous alumina by using alumina as a support in the metallic nanoparticle catalyst composition according to the embodiment of the present invention. It can be confirmed from FIG. 7 that even in the catalyst of the present invention using alumina, which is one of irreducible oxides, as a support, the carbon monoxide oxidation conversion effect is excellent in a room-temperature and normal-pressure atmosphere.

FIG. 8 shows a gas chromatographic curve of a carbon monoxide room-temperature oxidation experiment using a catalyst in which the gold nanoparticles are dispersed in porous titanium oxide by using titanium oxide as a support in the metallic nanoparticle catalyst composition according to the embodiment of the present invention. It can be confirmed from FIG. 8 that even the catalyst of the present invention using titanium oxide, which is one of reducible oxides as well as silica and alumina that are irreducible oxides, also, as a support, as has the carbon monoxide oxidation conversion effect in a room-temperature and normal-pressure atmosphere.

FIG. 9 shows a gas chromatographic curve of a carbon monoxide room-temperature oxidation experiment using a catalyst in which gold nanoparticles are dispersed in a heterogeneous-oxide mixed support by using silica-titanium oxide ($SiO_2$—$TiO_2$=1:1), which is a mixture of heterogeneous oxides, as a support, in the metallic nanoparticle catalyst composition according to the embodiment of the present invention. It can be confirmed from FIG. 9 that the catalyst of the present invention using the heterogeneous oxide mixture as a support also has the carbon monoxide oxidation conversion effects in a room-temperature and normal-pressure atmosphere as in the effects exhibited by a single type of oxide such as silica, alumina, or titanium oxide.

FIG. 10 is a graph showing carbon monoxide concentration change rate over time in a carbon monoxide removal performance experiment of an air purifier including the metallic nanoparticle catalyst composition according to the embodiment of the present invention. According to the experimental results according to the embodiment, it could be confirmed that an air cleaning filter including the catalysts of the present invention removed carbon monoxide having a concentration of 1000 ppm up to 100 ppm or less.

FIG. 11 shows a conversion rate depending on the temperature of a methane oxidation reaction using the gold nanoparticle catalyst embedded in the porous silica in the metallic nanoparticle catalyst composition according to the embodiment of the present invention. It can be confirmed from FIG. 11 that excellent performance is exhibited in which methane oxidation conversion occurs from a relatively low temperature and substantially all the methane is oxidized from 370° C. FIG. 12 shows a conversion rate depending on the temperature of a methane oxidation reaction ($CH_4$ 1000 ppm, $O_2$ 10%, $H_2O$ 10%, and SV=40,000 l/h) using a platinum group metal catalyst of the related art and can be relatively compared with the performance level of the gold nanoparticle catalyst composition according to the embodiment of the present invention shown in FIG. 11. FIG. 13 shows the results of a hydrogen oxidation reaction using the gold nanoparticle catalyst embedded in the porous silica in the gold nanoparticle catalyst composition according to the embodiment of the present invention. It can be confirmed from FIG. 13 that the hydrogen oxidation conversion performance is excellently ensured from room temperature.

FIG. 14 is an analysis graph obtained by measuring, through ultraviolet absorbance analysis, changes in concentration over time after the catalyst powder of the present invention is put into an aqueous solution of benzene, toluene, ethylbenzene, or xylene in order to confirm the oxidation catalytic reactivity of volatile organic compounds (VOC) in a room-temperature and normal-pressure atmosphere in the metallic nanoparticle catalyst composition according to the embodiment of the present invention. Each VOC was prepared as a 30 ml aqueous solution of 50 ppm, 200 mg of the catalyst powder of the present invention was put into the solution, and then, changes in the concentration of the VOC over time was measured while the resulting product is enclosed and stirred in an oxygen atmosphere. As a result, it can be confirmed from the graph that the concentration of the VOC has decreased to 20 ppm or less in about 30 minutes and has dropped to 5 ppm or less after 200 minutes. In addition, in 50 ppm aqueous solutions of benzene, toluene, ethylbenzene, and xylene, which aromatic compounds, a very strong smell was emitted even in an olfactory test, but the smell was hardly confirmed at the last measurement after about 3 hours of reaction. Thus, it can be confirmed that in the catalyst according to the embodiment of the present invention, excellent VOC oxidation performance is ensured at room temperature and normal pressure.

FIG. 15 is a graph obtained by measuring the interatomic distance distribution in the catalysts of the present invention using an extended X-ray absorption fine structure (EXAFS) analysis method for the catalyst reactivity improvement mechanism analysis of the present invention. From this graph, in the catalyst according to the present invention, the peak of a distance (a radial distribution function (RDF) corresponding to less than 2 Å) of an Au—O bond that cannot appear in natural gold was found, and it was confirmed that the shape of a peak corresponding to 'Au—Au' was asymmetrical. The analysis thereof is described in the detailed description of the present specification.

FIG. 16 illustrates an existing metal nanocage preparing process. In an existing catalyst preparing method in which nanoparticles surrounded by ligands are bound together with amphiphilic molecules (FIG. 16-a), it is difficult for oxide precursors to form oxides near the nanoparticles, and a spaced distance is present even if the oxides contract after calcination. Thus, a gap is eventually present at an interface between the nanoparticles and the support, so that a metal nanocage that cannot be stressed is formed (FIG. 16-d). This formation is summarized and expressed as a simple figure.

This can be supported by the catalyst reactivity improvement mechanism analysis of the present invention with reference to FIG. 15.

FIG. 17 illustrates the catalyst preparing process according to the present invention. The nanoparticles can be directly functionalized with ligands capable of inducing the oxide precursors on the surfaces of the nanoparticles to form the oxides very close to the surfaces of the nanoparticles. After the calcination, the oxides contract and compressive stress is applied to the nanoparticles, so that a catalyst structure having a structure in which no gap is present between the nanoparticles and the support is formed. This formation is summarized and expressed as a simple figure. (FIG. 17-d). Here, the expression 'the nanoparticles can be directly functionalized with ligands capable of inducing the oxide precursors on the surfaces of the nanoparticles' means that one end of a polymer ligand capable of inducing an ionized oxide precursor with an electrostatic force is induced so as to be conjugated with or anchored to a nanoparticle in the form of a covalent bond. In addition, the process of replacing an existing ligand (or capping agent) with a new ligand having a functional group having a higher affinity with the corresponding nanoparticle in this way is generally expressed as a ligand exchange. This can be supported by the catalyst reactivity improvement mechanism analysis in which the compressive deformation caused by the application of compressive stress affects some 'Au—Au' bond distances and energy levels of electrons in an atom so that a stable Au—O bond can be generated with respect to FIG. 15, and is data for easily explaining the catalytic activity of the present invention showing high oxidation efficiency in a room-temperature and normal-pressure atmosphere.

FIG. 18 shows, in the catalyst according to the embodiment of the present invention, results obtained by measuring the energy level of gold particles (hereinafter referred to as Au4f) in catalysts synthesized differently depending on the molecular weight of PEG (a polymer used as one of the embodiments of the present invention) used for preparing the catalysts by the X-ray photoelectron spectroscopy (XPS). In this graph, the x-axis, which has increased values toward the left of the graph, represents the binding energy (eV), and the y-axis represents the intensity. Hereinafter, to briefly describe the result graphs of FIG. 18, a graph (a) at the top shows the energy level of a gold particle (Au4f) in a catalyst prepared using PEG having a molecular weight of 1 kDa, a graph (b) shows the energy level of a gold particle measured by targeting a catalyst prepared using a molecular weight of 2 kDa, and a graph (c) shows the energy level of a gold particle measured by targeting a catalyst prepared using PEG having a molecular weight of 5 kDa. A graph (d) at the bottom is a graph obtained by measuring the energy level of Au particles dispersed in a nanocage prepared according to the existing metal nanoparticles catalyst process. Comparing 87.7 eV (Au4f5/2) and 84.1 eV (Au4f7/2), which are two peak values of this graph, with the result graphs (b), (c), and (d) of the energy (eV) of the gold particles in the catalysts according to the present invention, it can be confirmed that the Au4f energy (eV) has decreased as a catalyst is prepared using PEG having a smaller molecular weight.

The present invention provides a porous catalyst composition including an oxide matrix structure having mesopores and micropores; and metallic nanoparticles embedded in the oxide matrix structure having the mesopores and micropores. Specifically, the present invention provides a metallic nanoparticle dispersion in a form in which an oxide such as silica, alumina, or titanium oxide, which is an oxide that can guarantee thermal and chemical stability, or a mixture thereof, is formed as a matrix structure to embed the metallic nanoparticles, and the mesopores and micropores are secured in the matrix structure so that a reactant of a catalytic reaction can easily contact the surfaces of the metallic nanoparticles. In addition, the present invention provides a method for preparing the porous catalyst composition. Here, the 'metallic nanoparticles' means nanoparticles including at least one of a metal and a metal oxide, and in the following sentence, the metallic nanoparticles can be broadly interpreted as metallic nanoparticles under conditions that do not conflict with each other. In addition, the oxide matrix structure may be at least one of reducing oxides and irreducible oxides.

The porous catalyst composition according to the embodiment of the present invention may have a nanocage form in which the metallic nanoparticles embedded in the matrix structure are uniformly spread and fixed inside the structure by the mesopores, the contact between the metallic nanoparticles is blocked, and sufficient pores are open to allow entry and exit of reaction substance molecules introduced from the outside. A structure in which the metal or metal oxide nanoparticles is non-uniformly or non-hierarchically dispersed may be formed by the mesopores.

In the porous catalyst composition according to the embodiment of the present invention, the mesopores may be formed at the same level as or at a higher level as that of the micropores.

In the porous catalyst composition according to the embodiment of the present invention, the metallic nanoparticles are dispersed at intervals of about 10 to 500 nm and fixed to the structure, and the mesopores or micropores are characterized by being formed in a body centered cubic (BCC) structure between the metallic nanoparticles. In this way, in the present invention, a structure in which individual metallic nanoparticles are dispersed and arranged (individually isolated) constitutes a major feature distinguished from the related-art catalysts.

The method for preparing the porous catalyst composition according to the present invention broadly includes a step of binding a polymer to surfaces of the metallic nanoparticles stabilized by being covered with a stabilizer to functionalize the metallic nanoparticles; a step of mixing the functionalized metallic nanoparticles and an activator with an oxide precursor in a solution to synthesize a metallic nanoparticle dispersion embedded in a porous support; and calcining the metallic nanoparticle dispersion at 400 to 500° C. Here, the metal of the metallic nanoparticles may be, for example, at least one or more selected from a group consisting of metals including gold, silver, nickel, copper, palladium, platinum, rhodium, and the like, and metal oxides, and the metallic nanoparticles may be prepared by the method described in the present specification or may be prepared by using a commercially available material or by a method known to those having ordinary skill.

Here, the 'binding a polymer to surfaces of the nanoparticles to functionalize the nanoparticles' includes a method of attaching a polymer capable of inducing an oxide precursor through several steps in addition to directly functionalizing the polymer that can induce the oxide precursor on the surfaces of the nanoparticles.

In addition, the oxide precursor refers to at least one or more oxide precursors for forming at least one or more oxides selected from a group consisting of silica, alumina, titanium oxide, iron oxide, cerium oxide, tungsten oxide, cobalt oxide, magnesium oxide, zirconium oxide, calcium oxide, sodium oxide, and manganese oxide.

In the method for preparing a porous catalyst composition according to the present invention, the stabilizer of the metallic nanoparticles may be one or more of oleylnamine, sodium citrate, chitosan, polyvinyl alcohol, polyvinyllipolidone, and polyDADMAC but is not limited thereto.

In addition, in the method for preparing a porous catalyst composition according to the present invention, the length of the pores can be adjusted by adjusting the molecular weight of the polymer used for the functionalization, and the molecular weight can be selected in a range of 200 to 20 k Da, more preferably, can be selected from a range of 300 to 10 k Da. By adjusting the molecular amount of the polymer in this way, the length of the pores can be adjusted, and as a result, the volume of the pores can also be adjusted.

The polymer used for the functionalization is a hydrophilic polymer and may be selected from polymers capable of having charges through ionization or hydrogen bonds in an aqueous solution. For example, the polymer used for the functionalization may be at least any one or more selected from thiolated polymers such as poly(N-isopropylacrylamide) (PNIPAM), polyacrylamide (PAM), poly(2-oxazoline) (POx), polyethylenimine (PEI), polyacrylic acid (PAA), polymethacrylate, other acrylic polymers, polyethylene glycol (PEG), polyethylene oxide (PEO), polyvinyl alcohol (PVA), polyvinylpyrrolidone (PVP), and the like.

In addition, in the method for preparing a porous catalyst composition according to the present invention, the activator is amphiphilic molecules that form a spherical micelle and is preferably a block copolymer of a hydrophilic chain and a hydrophobic chain. The activator may be at least one or more of Pluronic F127, Pluronic F108, Pluronic F87, Pluronic F68, Pluronic F38, and Brij but is not limited thereto. Here, for example, the Pluronic F127 and the like are block copolymers of a hydrophilic polyethylene oxide (PEO) chain and a hydrophobic polyphenylene oxide (PPO) chain, and a Brij-based surfactant can be used as an activator in the present invention because the surfactant has a structure having a hydrocarbon chain. Particularly, since the activator has a longer PEO chain than the PPO chain, the activator is very soluble in water and forms a spherical micelle in an aqueous solution, and may react with a silica precursor to form porous silica having pores of a BCC structure.

In addition, the method for preparing a porous catalyst composition according to the present invention has the effect that it is possible to easily adjust the ratio of mesopores and micropores or total porosity in the porous catalyst composition of the present invention by adjusting the amount of the activator. In this case, in the mixture of the functionalized nanoparticles and the activator, the activator is preferably selected in a weight ratio of 10 to 99%.

In addition, in the method for preparing a porous catalyst composition according to the present invention, the oxide precursor may be at least one or more oxide precursors for forming at least one or more oxides selected from a group consisting of silica, alumina, titanium oxide, iron oxide, cerium oxide, tungsten oxide, cobalt oxide, magnesium oxide, zirconium oxide, calcium oxide, sodium oxide, and manganese oxide. Hereinafter, a silica precursor, an alumina precursor, a titanium oxide precursor, and the like will be described as examples.

Specifically, in the method for preparing a porous catalyst composition according to the present invention, the silica precursor may be tetramethylsilicate, tetraethyl orthosilicate, tetrapropylorthosilicate, tetrabutylorthosilicate, tetrachlorosilane, sodiumsilicate, tetraisopropoxysilane, methoxytriethoxysilane, dimethoxydiethoxysilane, ethoxytrimethoxysilane, methyltrimethoxysilane, methyltriethoxysilane, ethyltriethoxysilane, dimethyldimethoxysilane, dimethyldiethoxysilane, diethyldiethoxysilane, tetramethoxymethylsilane, tetramethoxyethylsilane, tetraethoxymethylsilane, or the like, and tetraethylorthosilicate is preferable.

In addition, in the method for preparing a porous catalyst composition according to the present invention, the alumina precursor may be selected from the group consisting of aluminum ethoxide, aluminum nitrate nonahydrate, aluminum fluoride trihydrate, aluminum phosphate hydrate, aluminum chloride hexahydrate, aluminum hydroxide, aluminum sulfate hexadecahydrate, aluminum ammonium sulfate dodecahydrate, and combinations thereof, and aluminum ethoxide may be preferably used.

In addition, in the method for preparing a porous catalyst composition according to the present invention, the titanium dioxide precursor may be selected from a group consisting of titanium tetraisopropoxide, titanium butoxide, titanium ethoxide, titanium oxysulfate, titanium chloride, and combinations thereof, and titanium tetraisopropoxide may be preferably used.

In the method for preparing a porous catalyst composition according to the present invention, the molecular weight of the polymer used for the functionalization and the mixing ratio of the activator can be used to adjust the pores of the catalyst. An effect is triggered that as the molecular weight of the polymer increases, the length of the micropores coupled to the nanoparticle surfaces increases, and an effect is triggered that as the mixing ratio of the activator increases, the volume of the mesopores and the volume of the micropores directly coupled to the mesopores increase and thus the porosity of the entire structure increases. Moreover, by forming the metallic nanoparticle dispersion using an activator such as Pluronic F127, there is an effect that the ratio of the mesopores is remarkably increased. Hereinafter, the configuration and effects of the present invention will be described in more detail through specific examples, but these examples are merely intended to more clearly understand the present invention and are not intended to limit the claims of the present invention.

Example 1: Preparation of Gold Nanoparticle Catalyst Embedded in Porous Silica

In order to specifically explain the method for preparing a porous catalyst composition having metallic nanoparticles according to the present invention by way of one example, a method of exemplarily selecting gold nanoparticles as a target as the metallic nanoparticles to prepare a porous catalyst composition of the gold nanoparticles will be described below. In the present embodiment, detailed steps will be exemplarily described according to conditions for forming a catalyst containing 4 nm of gold nanoparticles.

[Step 1] Functionalizing Metallic Nanoparticles with Polymer

[Step 1-1] Gold Nanoparticles Stabilized by being Covered with Oleylamine are Synthesized According to the Following Procedure.

First, oleylamine was selected as a stabilizer, and a solution composed of 60 ml of tetralin, 60 ml of oleylamine, and 0.6 g of $HAuCl \cdot H_2O$ was prepared by being stirred at room temperature for 10 minutes. 6 mmol of tetrabutylammonium bromide (TBAB), 6 ml of tetralin, and 6 ml of oleylamine were subjected to ultrasonic pulverization and mixed together, and rapidly added into the solution. Then, the solution was further stirred at room temperature for an hour, ethanol was added thereto, and then centrifugation was performed to precipitate gold nanoparticles. The gold nanoparticle precipitate was re-dispersed with hexane, ethanol was added, and centrifugation was performed. The 4-nm gold nanoparticles formed in this way were dispersed in 100 ml toluene as being formed.

[Step 1-2] the Surfaces of the Gold Nanoparticles were Functionalized with Thiolated PEG Through the Following Method.

The gold nanoparticles dispersed in toluene in Step 1-1 were further diluted with 100 ml of tetrahydrofuran, a thiolated polymer was selected to bind the polymer to the surfaces of the gold nanoparticles to functionalize the gold nanoparticles, and 1 g of 1 kDa thiolated PEG was added. After this was stirred, hexane was added and centrifugation was performed to precipitate gold nanoparticles (4-Au-PEG) functionalized with PEG. The 4-Au-PEG collected by the precipitation was dried and then dispersed in water.

[Step 2] Synthesis of Metallic Nanoparticle Dispersion Embedded in Porous Silica by Mixing with Silica Precursor in Solution in which Functionalized Metallic Nanoparticles and Activator are Dispersed.

After 0.088 g of 4-Au-PEG prepared in the above Step 1-2 was mixed with 0.396 g of Pluronic F127, which is an activator, and uniformly dispersed in 10 ml of 1.6 M HCl aqueous solution, 1.49 g of tetraethylosilicate (TEOS) was added to the dispersion liquid. Then, the dispersion liquid of the mixture was stirred for 15 minutes and maintained at room temperature for 40 hours without stirring to prepare a red precipitate. The red precipitate formed in this way corresponds to a PEG-functionalized gold nanoparticle dispersion embedded in the porous silica.

[Step 3] Calcination of Synthesized Metallic Nanoparticle Dispersion

The red precipitate prepared in the previous step was washed with water, dried, and then calcined at a temperature of 450° C. to remove PEG and Pluronic F127 polymers, thereby preparing a gold nanoparticle catalyst embedded in the porous silica.

In the method for preparing a porous catalyst composition according to the embodiment of the present invention, the mixture of F127 used as the activator and the gold nanoparticles was selected as a weight ratio of 9:2. However, it is possible to prepare the mixture in a different ratio converted depending on the purpose of use because the mixing ratio is exemplary and can be optionally and easily adjusted.

Next, in order to explain the room-temperature catalytic activity in various oxide supports other than the silica support as an oxide support in the examples of the present invention, porous catalyst compositions were prepared with different types of oxide precursors by the following method.

Example 2: Preparation of Gold Nanoparticle Catalyst Embedded in Porous Alumina 0.15 g of gold nanoparticles functionalized with PEG (4-Au-PEG), which was prepared in the same manner as in [Step 1-2] of the above Example 1, and 0.675 g of Pluronic F127, were prepared and uniformly dispersed in a mixed solution of 0.8 mL of nitric acid (68%) and 40 mL of ethanol, and then, 0.81 g of aluminum ethoxide was added to the dispersion liquid. Then, the dispersion liquid of the mixture was stirred for 3 hours, maintained without stirring at room temperature for 24 hours, and then dried at a temperature of 60° C. for 3 hours to prepare a red solid. Thereafter, the red solid was washed with water, dried, and calcined at a temperature of 400° C. to remove PEG and Pluronic F127 polymers, thereby preparing a gold nanoparticle catalyst embedded in porous aluminum oxide.

Example 3: Preparation of Gold Nanoparticle Catalyst Embedded in Porous Titanium Oxide 0.10 g of gold nanoparticles functionalized with PEG (4-Au-PEG), which was prepared in the same manner as in [Step 1-2] of the above Example 1, and 0.44 g of Pluronic F127 were prepared and uniformly dispersed in a mixed solution of 0.68 mL of 37% hydrochloric acid and 17.05 mL of ethanol, and then, 2.28 g of titanium tetraisopropoxide was added to the dispersion liquid. Then, the dispersion liquid of the mixture was stirred for 3 hours, maintained without stirring at room temperature for 24 hours, and then dried at a temperature of 60° C. for 3 hours to prepare a red solid. Thereafter, the red solid was washed with water, dried, and calcined at a temperature of 400° C. to remove PEG and Pluronic F127 polymers, thereby preparing a gold nanoparticle catalyst embedded in a porous titanium oxide support.

Example 4: Preparation of Gold Nanoparticle Catalyst Embedded in Mixed Support of Porous Silica ($SiO_2$)-Titanium Oxide ($TiO_2$)

Next, a mixed support ($SiO_2$—$TiO_2$, mol ratio=1:1) of silica ($SiO_2$)-titanium oxide ($TiO_2$) was prepared by the following method in order to confirm whether the room-temperature and normal-pressure catalytic effects of the present invention are effective in not only a single type of oxide support but also a heterogeneous-oxide mixed support.

0.10 g of gold nanoparticles functionalized with PEG (4-Au-PEG), which was prepared in the same manner as in [Step 1-2] of the above Example 1, and 0.44 g of Pluronic F127 were prepared and uniformly dispersed in a mixed solution of 0.68 mL of 37% hydrochloric acid and 17.05 mL of ethanol, and then, 0.83 g of tetraethylosilicate (TEOS) serving as a silica precursor and 1.13 g of titanium tetraisopropoxide serving as a titanium oxide precursor were added to the dispersion liquid. Then, the dispersion liquid of the mixture was stirred for 3 hours, maintained without stirring at room temperature for 24 hours, and then dried at a temperature of 60° C. for 3 hours to prepare a red solid. Thereafter, the red solid was washed with water, dried, and calcined at a temperature of 400° C. to remove PEG and Pluronic F127 polymers, thereby preparing a gold nanoparticle catalyst embedded in a silica-titanium oxide mixed support.

<Study>

In the embodiment of the present invention, the gold nanoparticle dispersion was prepared in a form in which titanium oxide, which is one of reducible oxides other than silica and alumina that are irreducible oxides that can guarantee the thermal and chemical stability, is used as the matrix structure to protect the gold nanoparticles, and the pores were secured in the matrix structure so that the reactant of the catalytic reaction can contact the surfaces of the gold nanoparticles. That is, the catalysts in the form of the gold nanoparticles confined inside various oxide nanocages are synthesized, and the performance thereof is confirmed through various catalytic reactions below.

Generally, in order to test the activity of the various catalysts as well as the catalyst of gold nanoparticles and the preparing methods and effects thereof, the low-temperature carbon monoxide (CO) oxidation reaction is a reaction preferred by those having ordinary skill belonging to this field, and almost all the catalysts prepared are tested with this reaction. (Refer to Chem. Soc. Rev, 2008, 37, page 2115 of 2096-2126) According to what is known so far, in the gold nanoparticle catalyst of the related art, it is known that gold nanoparticles exhibit very high activity when a reducible metal oxide such as $TiO_2$ or $Fe_2O_3$ is used as a support, but has little or very low activity at low temperature when an irreducible oxide such as silica ($SiO_2$) or alumina ($Al_2O_3$) is used as a support. That is, as shown in the graph of FIG. 2, it can be confirmed that the existing gold nanoparticle catalyst has the highest carbon monoxide oxidation rate when $TiO_2$ is used and then has the higher carbon monoxide oxidation rate in order of $Fe_2O_3$, $MgAl_2O_4$, and $Al_2O_3$ (Lopez, N. et al., J. Catalysis, 2004, 223, 232-235).

First, as a result of observing the nanostructure synthesized through the process of the above embodiment as the embodiment of the present invention through the transmission electron microscope, it can be confirmed that the gold nanoparticles embedded in the porous silica as shown in FIG. 3 are stably dispersed without sintering even after a calcination process at 450° C. This shows that the catalyst composition of the present invention is more thermally stable compared to a case where the existing gold nanoparticles have a Tamman temperature of 396° C.

In addition, the content of gold in the catalyst as confirmed by inductively coupled plasma optical emission spectrometer (IPC-OES) was 5.56 wt %. Here, the content of gold can be controlled by adjusting the mixing ratio of 4-Au-PEG and Pluronic F127 in the above Step 2.

In addition, as a result of analyzing the pore structure of the prepared catalyst composition using the Ar gas adsorption method in order to grasp the pore structure, an adsorption curve as shown in FIG. 4(*a*) can be obtained. As a result of analyzing this using a density functional theory (DFT) method, the pore distribution as shown in FIG. 4(*b*) can be obtained. Referring to FIG. 4, the pore volume per unit mass of the catalyst composition is 0.278 cc/g, and the specific surface area is about 916 $m^2$/g, which are results similar to those of general porous silica synthesized using a pluronic polymer. It can be confirmed that no significant deterioration in porosity performance occurs despite the embedment of the gold nanoparticles.

Next, the performance of the catalyst composition according to the embodiment of the present invention will be specifically described by way of the experimental results.

(1) Carbon Monoxide Oxidation Performance

As a result of performing a carbon monoxide oxidation experiment at room temperature using the silica support catalyst composition according to the embodiment of the present invention, a gas chromatographic curve as shown in FIG. 5 can be obtained. This is a case where a carbon monoxide oxidation experiment is performed under the condition that a gas containing 1% carbon monoxide and 20% oxygen was allowed to flow through 100 ml of a catalyst at a flow rate of 100 cc (STP) per minute. The remaining amount of carbon monoxide is not detected by a measurement sensor used. As a result, it can be confirmed that substantially all the carbon monoxide is converted into carbon dioxide.

In addition, prior to the initial measurement, the catalyst composition was heated to 350° C. to activate the catalyst while the mixing ratio of the gas and the flow rate were maintained as described above, and then cooled at room temperature. To observe and summarize the carbon monoxide oxidation reaction while heating the catalyst, the conversion rate distribution as shown in FIG. 6 can be obtained. It can be confirmed from this that the catalyst according to the embodiment of the present invention substantially maintains a conversion rate of 100%.

Next, as a result of performing a carbon monoxide oxidation experiment at room temperature using the alumina support catalyst composition according to the embodiment of the present invention, a gas chromatographic curve as shown in FIG. 7 was obtained. The experiment was performed under the condition that a gas containing 1% carbon monoxide and 20% oxygen was allowed to flow through 100 mg of the alumina support catalyst composition at a flow rate of 100 cc (STP) per minute. As a result of the measurement, it was confirmed that all the carbon monoxide was oxidized. Accordingly, it can be seen that the effect of the present invention exhibiting a high oxidation rate at room temperature is excellent even in the alumina support, which is another irreducible oxide other than the silica support.

Next, as a result of performing a carbon monoxide oxidation experiment at room temperature using the titanium oxide support catalyst composition according to the embodiment of the present invention, a gas chromatographic curve as shown in FIG. 8 could be obtained. The experiment was performed under the condition that a gas containing 1% carbon monoxide and 20% oxygen was allowed to flow through 100 mg of the titanium oxide support catalyst composition at a flow rate of 100 cc (STP) per minute. As a result of the measurement (FIG. 8), it was confirmed that about 82% carbon monoxide was oxidized.

Through the above experiment, it can be seen that the high-efficiency low-temperature catalytic reaction effects of the present invention are effective not only in a case where an irreducible oxide such as silica or alumina is used as a support but also in a case where a reducible oxide is used as a support.

Next, in order to confirm whether the effects exhibited in the catalyst composition of the present invention using a single type of oxide such as silica, alumina, or titanium oxide are effective in a mixture of heterogeneous oxides, a carbon monoxide oxidation experiment was performed at room temperature using the mixed (silica ($SiO_2$):titanium oxide ($TiO_2$)=1:1) support catalyst composition according to the embodiment of the present invention. As for the experimental conditions, a gas containing 1% carbon monoxide and 20% oxygen was allowed to flow through 100 mg of the mixed support catalyst composition at a flow rate of 100 cc (STP) per minute in the same manner as the previous experiment. As a result, an oxidation rate of 19% could be confirmed (Refer to FIG. 9).

Next, an experiment for confirming the efficiency of removing carbon monoxide (CO) with an air purification filter using the gold nanoparticle catalyst embedded in the porous silica ($SiO_2$) support according to the embodiment of the present invention will be described. 50 mg of a porous silica catalyst powder sample prepared according to the embodiment of the present invention was prepared. Then, the catalyst structure powder sample was uniformly applied to a front surface of a first filter unit for removing foreign substances from the introduced air with a brush to form a second filter unit. The first filter unit used in this case was 11.8 cm×5.7 cm, and an ultrafine filter having a pore size of 0.3 μm was used.

The air purification filter prepared in this way was mounted on an air purifier to measure air purification performance or the like. The air purification performance was measured by using a commercially available air purifier made (Model name: AP139MWA) by LG Electronics but without providing any other filter means other than an air purification filter of this air purifier.

Comparative Example

For comparison, an air purification filter, which was not provided with the second filter unit by using the material of the ultrafine filter used in the first filter unit in the previous example but not applying the catalysts of the present invention, was prepared, and the performance thereof was measured under the same experimental conditions.

Experimental Measurement and Review

The carbon monoxide (CO) oxidation was performed within about 75,000 cm3 of a quasi-enclosed cleanness test space, and an air purification filter applied with a catalyst according to the embodiment of the present invention was mounted on an air purifier, and a carbon monoxide generation source and a carbon monoxide measuring instrument were installed on one side of the cleanness test space. Then, when the carbon monoxide concentration from the carbon monoxide generation source was 1,000 ppm, the air purifiers according to the examples and the comparative example were operated to measure the gas concentration in the space in units of a predetermined time. Experimental measurements were carried out at atmospheric pressure to create an environment that can be easily encountered in everyday life and operated at room temperature for 900 seconds (15 minutes). Incompletely burned charcoal was used as the carbon monoxide generation source, and a commercially available known device was used as the carbon monoxide measuring instrument.

Referring to the graph of FIG. 10 showing the results, a circle-marked line represents the performance of the air purifier using the air purification filter including the catalysts of the present invention, and a square-marked line represents the performance of the air purifier using the air purification filter according to the comparative example. It can be confirmed that the concentration of carbon monoxide in the cleanness test space in which the air purification filter was used dropped rapidly within 100 seconds and decreased to 90 ppm after approximately 900 seconds (15 minutes). That is, it could be confirmed that the air purifier using the air purification filter of the present invention converted 90% or more of carbon monoxide into carbon dioxide.

TABLE 1

|  | CO concentration (ppm) | |
| --- | --- | --- |
|  | Comparative example | Example |
| 0 min | 1000 ppm | 1000 ppm |
| 15 min | 1000 ppm | 90 ppm |

(2) Methane Oxidation Performance

An oxidation reaction experiment of methane gas depending on temperature may be performed using the catalyst composition according to the embodiment of the present invention, and the performance thereof may be measured by the gas chromatography. As performance experiment conditions, in a case where a mixed gas of 6,000 ppm of methane, 19.4% of oxygen, and 80% of helium is allowed to flow through 100 mg of catalyst at 100 cc (STP) per minute, the space velocity is about 50,000 times the catalyst volume per hour. As shown in FIG. 11, some methane is oxidized at a temperature of about 180° C. and carbon dioxide starts to be detected. It can be confirmed that, despite the fact that the concentration of methane injected in this performance experiment is about 6 times higher than the concentration of 1000 ppm used in general performance experiments, 50% or more of methane is oxidized at lowers than 300° C. and 100% of methane is completely oxidized at about 370° C.

When this is compared with the performance of the platinum group catalyst (http://dieselnet.com/tech/catalyst_methane_oxidation.php) of the related art shown in FIG. 12, the porous catalyst of gold nanoparticles according to the embodiment of the present invention has the effect of lowering the oxidation temperature of methane by about 100° C. When the catalysts of the present invention are used, it is possible to provide the effect of removing methane, which is emitted without completely burned in internal combustion engines for natural gas, at a relatively low temperature, thereby reducing the emission of greenhouse gases and improving energy efficiency. In addition, in cases where high-temperature reaction conditions are essentially required in addition to the example of the methane oxidation reaction, it is difficult to apply the existing gold nanocatalyst, which does not guarantee high-temperature stability. However, the catalysts of the present invention have the effect of greatly expanding the available region of the gold nanoparticle catalyst due to structurally guaranteed high stability.

TABLE 2

|  | 180° C. | 370° C. | 500° C. | Concentration of added methane |
| --- | --- | --- | --- | --- |
| 5.56% Au/silica | 10% | 100% | 100% | 6000 ppm |
| 5% Pb/$Al_2O_3$ | 0 | 78% | 100% | 1000 ppm |
| 2% Rh/$Al_2O_3$ | 0 | 23% | 90% | 1000 ppm |
| 2% Pt/$Al_2O_3$ | 0 | 3% | 37% | 1000 ppm |

(Comparison of Conversion Rate Depending on Temperature of Methane Oxidation Reaction Using Catalysts of the Present Invention and Existing Platinum Group Metal Catalyst)

(3) Hydrogen Oxidation Performance 60 cc of air per minute and 1.7 cc of hydrogen per minute are mixed together and passed through 100 mg of the catalyst composition according to the embodiment of the present invention. The results obtained by analyzing the passed gas using the gas chromatography can be summarized as shown in FIG. 13, and it can be confirmed that hydrogen is completely oxidized and removed at temperatures such as 25° C., 66° C., and 106° C., respectively. It can be seen from this that the catalysts of the present invention have very high activity at a lower temperature than the hydrogen oxidation reaction using the existing platinum group catalyst, and it can be seen that the catalysts can be usefully utilized as catalysts for hydrogen fuel cells or catalysts for removing hydrogen.

(4) Volatile Organic Compound (VOC) Oxidation Performance

The oxidation catalytic reactivity, in a room-temperature and normal-pressure atmosphere, of benzene, toluene, ethylbenzene, and xylene that are typical volatile organic compounds (VOC) was confirmed using the catalyst composition according to the embodiment of the present invention. In this case, an experiment was performed by an aerobic oxidation method of measuring an aerobic oxidation reaction in an aqueous solution rather than a gas-phase method due to the limited circumstances of equipment construction. Each volatile organic compound was prepared as 30 ml of 50 ppm aqueous solution, was filled with 200 mg of the catalyst composition, and enclosed. Then, while the volatile organic compound was stirred for 200 minutes on the room-temperature and normal-pressure conditions of an oxygen source, a change in the concentration of the volatile organic compound in the aqueous solution over time was measured through ultraviolet absorbance analysis. Here, as the oxygen source, an oxygen balloon (02 balloon) was used.

As a result of the experiment, it could be confirmed that benzene, toluene, ethylbenzine, and xylene all decreased to 20 ppm or less within about 25 minutes (FIG. 14) and decreased to about 5 ppm or less after 200 minutes.

In addition, after 50 ppm aqueous solution as each volatile organic compound, which emitted a very strong smell even in the olfactory test, was reacted for about 3 hours, almost no smell could be confirmed at the last measurement.

(5) Other Performances

As can be confirmed from the above experiments, it can be apparent to those having ordinary skill that the oxidation performance using the catalyst composition of the present invention can be usefully used for the oxidation reaction of liquids such as alcohol in addition to the oxidation reaction of various gases. For example, referring to the technical review literature data (Avelino Corma et al., Chem. Soc. Rev, 2008, 37, 2096-2126) written by prominent scholars in the relevant technical field, it is widely known that platinum group metals such as palladium and ruthenium oxide or nanoparticle catalysts such as gold can be used not only used to oxidize and convert gases such as carbon monoxide, hydrogen, and methane but also used to oxidize and convert liquids such as alcohol.

<Catalyst Reactivity Improvement Mechanism Analysis>

As previously described, precious metals such as gold are widely known to be chemically inert substances and have resistance to s oxidation. However, since 1989, it has been reported by Haruta et al. that gold particles reduced to nano-isize have activity in various reactions when supported with a high degree of dispersion on a support such as $Co_3O_4$, $Fe_2O_3$, or $TiO_2$. Thereafter, researches on nano-catalytic processes of various metals are being actively performed. However, the mechanism of the chemical reaction has not yet been clearly elucidated. However, there are cases where researchers analyzed phenomena according to nanotechnology or nanocatalyst technology through various experiments and researches, such as analyzing the role of the particle size in a catalytic action to confirm the activity depending on the size of the metal particles or analyzing the optical properties of nanometal particles using a UV-vis analyzer in order to confirm the characteristics depending on the form or arrangement of the metal particles.

Also in the present specification, the content obtained by analyzing the reaction phenomenon of the porous catalyst composition according to the present invention (hereinafter referred to as 'the catalysts of the present invention' or 'catalysts according to the present invention'), particularly, the mechanism of improving catalytic reactivity showing excellent catalytic effects at room temperature will be described as follows.

First, the catalysts of the present invention were analyzed using an extended X-ray absorption fine structure (EXAFS) analysis method that is a technique capable of analyzing the X-ray absorption characteristics to measure the interatomic distance distribution. As a result, a radial distribution function (RDF) peak corresponding to the distance (less than 2 Å) of Au—O bonds that cannot appear in natural gold (Au) is found. (FIG. 15).

It is known that gold is not naturally bonded with oxygen because the bond with oxygen is an endothermic reaction, and is reduced within a short time even when bonded. However, it was confirmed that the catalysts of the present invention generate and maintain a very stable Au—O bond. This phenomenon is one of the factors that can explain the very high activity of the catalysts of the present invention.

The present inventor found that the shape of the peak corresponding to 'Au—Au' is asymmetrical in the graph for the extended X-ray absorption fine structure analysis, and could confirm that the following analysis resulting from the fitting of two Gaussian functions was very appropriate by fitting the peak with a plurality of Gaussian functions and performing statistical processing on this.

In the graph of FIG. 15, it was confirmed that about 69% (corresponding to Peak 2) of Au—Au bond pairs maintained a distance corresponding to their original interatomic distance (about 2.8 Å) but about 31% (corresponding to Peak 1) of Au—Au bond pairs have a distance of about 2.6 Å spaced by about 0.2 Å or more from the original distance.

It can be inferred that this is because the positional relationship between the gold nanoparticles and the porous oxide support in the present invention is a structure capable of maximizing the interaction of the interface, unlike the existing nanocage structure catalysts. On the basis of this, the existing nanocage preparing process and the catalyst preparing process of the present invention will be specifically compared and described through the schematic diagrams of FIGS. 16 and 17. In FIG. 16, which is a schematic diagram of the existing nanocage structure catalyst preparing method, it can be understood that Au nanoparticles are surrounded by several ligands (oleylamine) and are encapsulated inside the micelles of the amphiphilic molecules due to the physical adsorption or hydrophobic interaction between the ligands and the hydrophobic polymer portions (PPO) of the amphiphilic molecules. That is, as shown in FIG. 16(*a*), it can be understood that a nanostructure is formed due to the physical adsorption between the ligands and the hydrophobic polymer portions (PPO) of the amphiphilic molecules while the Au nanoparticles and hydrophilic polymer portions (PEO) of the amphiphilic molecules are slightly separated from each other, then the nanostructure forms a condensed state (refer to FIG. 16(*b*)) as oxide precursors are induced in the hydrophilic polymer portions (PEO) of the amphiphilic molecules due to an electrostatic force or the like, then the oxide precursors are prepared as a polymer (refer to FIG. 16(*c*)) in which a three-dimensional structure is formed due to a polymerization reaction resulting from the condensation, and then, a nanocage (refer to FIG. 16(*d*)) in which a gap is present at an interface between each Au nanoparticle and the support is finally formed even if the organic substances surrounding the Au nanoparticles is removed by a high-temperature calcination process. In such a gap structure, it can be understood that stress cannot be generated between the nanocage and the Au nanoparticles, and the distance between the Au—Au bonds is also maintained at a general level.

On the other hand, in the method for preparing the catalyst structure according to the present invention, as shown in FIG. 17(*a*), it can be understood that differences in structure and effect that are remarkably different from those of the existing nanocage structure catalyst are caused by directly functionalizing the Au nanoparticles with the ligands that can induce oxide precursors on the surfaces of the Au nanoparticles in an initial stage. That is, it can be understood that a polymer (PEG (=PEO)) capable of inducing the oxide precursors on the surfaces of the Au nanoparticles (refer to FIG. 17(*a*)) is directly functionalized, the oxide precursors arrive very close to the surfaces of the Au nanoparticles, and oxides can start to be formed (refer to FIGS. 17(*b*) and 17(*c*)), and then, compressive stress is applied to the Au nanoparticles as the oxides naturally contract in the high-temperature calcination process, and the distance of some Au—Au bonds also decreases due to compressive deformation (refer to FIG. 17(d)). Since it is natural that this transformation affects the energy level of electrons in the atom, it is analyzed that the deformation may have affected the chemical properties of Au to create stable Au—O bonds.

Meanwhile, even if the polymer capable of inducing the oxide precursors is directly functionalized on the Au nanoparticles, the three-dimensional micropore structure of the support is determined depending on the selection of micelles (build blocks) that affect the formation of pores along with the synthesis of the porous oxides. In this case, unless suitable amphiphilic molecules are selected so as to induce a support structure capable of applying an appropriate stress to the Au nanoparticles, the high-efficiency room-temperature and normal-pressure catalyst performance as in the present invention cannot be expected.

Next, in the catalyst according to the embodiment of the present invention, results obtained by measuring the energy level of gold nanoparticles (hereinafter referred to as Au4f) (7/2, 5/2) in catalysts synthesized differently depending on the molecular weight of PEG (a polymer used as one of the embodiments of the present invention) by the X-ray photoelectron spectroscopy (XPS) will be described. First, the X-ray photoelectron spectroscopy is an analysis method in which when the X-rays are incident on and absorbed by a substance using X-rays as a light source, some of the electrons excited by the energy of the X-rays are released out of the substance and the kinetic energy of the electrons are analyzed. When the kinetic energy is detected, the binding energy of the electrons can be known, and the binding energy of each atom has a specific value. Thus, the ingredients of the substance can be known. When electrons are released, the binding energy slightly varies depending on the surrounding environment. Therefore, the atomic composition of the substance and the binding state of electrons can be investigated through this variation.

FIG. 18 shows the results obtained by measuring the energy level of Au4f (7/2, 5/2) by this analysis method. It can be confirmed from FIG. 18 that the energy (eV) of Au4f5/2 and Au4f7/2 is shifted to the right toward a graph of 1 kDa (FIG. 18(c)), a graph of 2 kDa (refer to FIG. 18(b)), and a graph of 5 kDa (refer to FIG. 18(a)) depending on the molecular weight of PEG used for the preparation of the catalysts with respect to the two peak values of 87.7 eV (Au4f5/2) and 84.1 eV (Au4f7/2) of a graph (18(d)) obtained by measuring the energy level of Au particles dispersed in a nanocage prepared according to the existing metal nano particle catalyst process, and decreases to 87.0 eV (Au4f5/2) and 83.4 eV (Au4f7/2) in FIG. 18(a) in which the PEG having the smallest molecular weight is used. That is, it can be confirmed from the graph of FIG. 18 that the energy level of the Au particles in the synthesized catalysts changes depending on the molecular weight of PEG used as the ligands.

This is because the number density per area of PEG chains functionalized on the surfaces of the Au particles varies depending on the molecular weight of PEG. Therefore, an aspect in which the oxide precursors are induced on the surfaces of the particles to form oxides varies. This can be understood as a phenomenon that occurs as the interfacial interaction between the nanoparticles and the oxide support changes.

TABLE 3

| MW of PEG (kDa) | Areal PEG Density (per nm2) | Au4f 7/2 eV | Au4f 5/2 eV |
| --- | --- | --- | --- |
| N/A | 0 | 84.06 | 87.73 |
| 1 | 3.69 | 83.37 | 87.01 |
| 2 | 2.57 | 83.52 | 87.20 |
| 5 | 1.65 | 83.56 | 87.20 |

(Results of Energy Level of Au4f(7/2, 5/2) Measured by X-Ray Photoelectron Spectroscopy)

The phenomenon found in this analysis, that is, the distance distribution between metal atoms, the difference in energy level, or the like, which is caused by changes in the interfacial interaction between the nanoparticles and the oxide support, is, well consistent with the experimental results in which the catalysts using various supports, such as silica, alumina, titanium oxide, a silica-titanium oxide mixture have achieved excellent room-temperature and normal-pressure catalytic activity in the embodiment of the present invention.

This means that the energy level of the catalyst particles can be controlled as necessary by appropriately combining various materials used in the synthesis of the catalyst structure, and provides technical means for artificially designing and preparing catalysts having specific reactivity and selectivity. Thus, it is expected that it is possible to bring about great innovation throughout industries such as petrochemical, materials, environment, and automobiles.

Supposing that the existing catalyst development relies on chemistry to study the composition and properties of materials based on combinations of materials, for example, materials such as nanoparticle-support or nanoparticle-nanoparticle, the catalyst preparing method of the present invention provides technical means capable of physically controlling the energy level or bandgap energy of specific catalyst substances, thereby artificially inducing catalytic activity that is not present in the natural world.

In addition to this, the foregoing description of the present invention is for illustrative purposes only, and those having ordinary knowledge in the art to which the present invention pertains will appreciate that the present invention can be easily modified in other specific forms without changing the technical spirit or essential features. Therefore, it should be understood that the embodiment described above is exemplary and non-limiting in all respects. For example, each component described as a single type may be carried out as being distributed or divided, and similarly, components described as being distributed or divided may also be carried out in a combined form within the scope of the understanding of those having ordinary skill. In addition, the steps of the method may be carried out in such a manner that each step is performed multiple times or is performed multiple times in combination with at least one other step.

It should be interpreted that the scope of the present invention is represented by the claims to be described below, and all changed or modified forms derived from the meaning and scope of the claims and the equivalent concept thereof are included in the scope of the present invention.

The invention claimed is:
1. A method for preparing a porous catalyst composition having metallic nanoparticles, comprising:
a step of covering metallic nanoparticles containing at least any one of a metal and a metal oxide with a stabilizer to stabilize the metallic nanoparticles and then binding a polymer to surfaces of the metallic nanoparticles to functionalize the metallic nanoparticles (Step 1);

a step of mixing an oxide precursor with a solution in which the functionalized metallic nanoparticles and an activator are mixed and dispersed, thereby synthesizing a metallic nanoparticle dispersion embedded in an oxide support (Step 2); and a step of calcining the metallic nanoparticle dispersion (Step 3), wherein the porous catalyst composition comprises the oxide support in which the metallic nanoparticles are dispersed with varying numbers of pores between the metallic nanoparticles, wherein there is no gap between the oxide support and the metallic nanoparticles so as to apply compressive stress to the metallic nanoparticles, and wherein the oxide support comprises pores having a Body-Centered Cubic (BCC) structure between the metallic nanoparticles, wherein the stabilizer is one or more of oleylnamine, sodium citrate, chitosan, polyvinyl alcohol, polyvinylpyrrolidone, polyDADMAC, and oleic acid, and wherein the activator is amphiphilic molecules that form a spherical micelle and is a block copolymer of a hydrophilic chain and a hydrophobic chain.

2. The method for preparing a porous catalyst composition having metallic nanoparticles according to claim 1, wherein a polymer used for the functionalization has a molecular weight selected in a range of 200 to 20 k Da.

3. The method for preparing a porous catalyst composition having metallic nanoparticles according to claim 2, wherein the polymer used for the functionalization has a molecular weight selected in a range of 300 to 10 k Da.

4. The method for preparing a porous catalyst composition having metallic nanoparticles according to claim 1, wherein a length of pores is adjusted by adjusting the molecular weight of the polymer used for the functionalization.

5. The method for preparing a porous catalyst composition having metallic nanoparticles according to claim 1, wherein the pores include mesopores and micropores, and wherein a ratio of the mesopores and micropores or a total porosity is adjusted by adjusting an amount of the activator when the functionalized metallic nanoparticles and the activator are mixed.

6. The method for preparing a porous catalyst composition having metallic nanoparticles according to claim 1, wherein the oxide precursor forms at least one or more oxides selected from a group consisting of silica, alumina, titanium oxide, iron oxide, cerium oxide, tungsten oxide, cobalt oxide, magnesium oxide, zirconium oxide, calcium oxide, sodium oxide, and manganese oxide.

7. The method for preparing a porous catalyst composition having metallic nanoparticles according to claim 6, wherein the silica is formed from any one precursor selected from a group consisting of tetramethylsilicate, tetraethyl orthosilicate, tetrapropylorthosilicate, tetrabutylorthosilicate, tetrachlorosilane, sodiumsilicate, tetraisopropoxysilane, methoxytriethoxysilane, dimethoxydiethoxysilane, ethoxytrimethoxysilane, methyltrimethoxysilane, methyltriethoxysilane, ethyltriethoxysilane, dimethyldimethoxysilane, dimethyldiethoxysilane, diethyldiethoxysilane, tetramethoxymethylsilane, tetramethoxyethylsilane, tetraethoxymethylsilane, and combinations thereof.

8. The method for preparing a porous catalyst composition having metallic nanoparticles according to claim 6, wherein the alumina is formed from any one precursor selected from a group consisting of aluminum ethoxide, aluminum nitrate nonahydrate, aluminum fluoride trihydrate, aluminum phosphate hydrate, aluminum chloride hexahydrate, aluminum hydroxide, aluminum sulfate hexadecahydrate, aluminum ammonium sulfate dodecahydrate, and combinations thereof.

9. The method for preparing a porous catalyst composition having metallic nanoparticles according to claim 6, wherein the titanium oxide is formed from any one precursor selected from a group consisting of titanium tetraisopropoxide, titanium butoxide, titanium ethoxide, titanium oxysulfate, titanium chloride, and combinations thereof.

10. The oxidation catalyst using a porous catalyst composition according to claim 1, wherein the activator is Pluronic F127 Poloxamer 407.

* * * * *